US012723720B2

(12) United States Patent
An et al.

(10) Patent No.: US 12,723,720 B2
(45) Date of Patent: Sep. 1, 2026

(54) GAS CYLINDER REPLACEMENT SYSTEM

(71) Applicant: Samsung Electronics Co., Ltd., Suwon-si (KR)

(72) Inventors: Byung Jun An, Suwon-si (KR); Hyun Kook Jeon, Suwon-si (KR); Kwang-Jun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/828,800

(22) Filed: Sep. 9, 2024

(65) Prior Publication Data

US 2025/0207734 A1 Jun. 26, 2025

(30) Foreign Application Priority Data

Dec. 21, 2023 (KR) ........................ 10-2023-0188989
Apr. 16, 2024 (KR) ........................ 10-2024-0050851

(51) Int. Cl.
*F17C 13/08* (2006.01)

(52) U.S. Cl.
CPC .... *F17C 13/084* (2013.01); *F17C 2201/0104* (2013.01); *F17C 2205/0111* (2013.01); *F17C 2205/0323* (2013.01); *F17C 2270/0518* (2013.01)

(58) Field of Classification Search
CPC ............ F17C 13/084; F17C 2201/0104; F17C 2205/0111; F17C 2205/0323; F17C 2270/0518
See application file for complete search history.

(56) References Cited

FOREIGN PATENT DOCUMENTS

| | | | | | |
|---|---|---|---|---|---|
| CN | 103328876 B | * | 6/2017 | | B60P 3/224 |
| JP | 2023093586 A | * | 7/2023 | | |
| KR | 10-2019-0040922 A | | 4/2019 | | |
| KR | 20190040922 A | * | 4/2019 | | F17C 13/084 |
| KR | 102049326 B1 | * | 11/2019 | | F17C 13/04 |
| KR | 102073165 B1 | * | 2/2020 | | H01L 21/67017 |

(Continued)

OTHER PUBLICATIONS

Kita et al.; JP2023093586A Gas Filling System for Filling Gas Into Gas Cylinder, Mounting Hand, and Transferring Hand; EPO English Machine Translation; Jul. 24, 2023, pp. 1-6 (Year: 2023).*

(Continued)

*Primary Examiner* — Bayan Salone
(74) *Attorney, Agent, or Firm* — Muir Patent Law, PLLC

(57) ABSTRACT

There is provided a gas cylinder replacement system that may automatically couple or remove a gas pipe and a gas cylinder to or from each other. The gas cylinder replacement system includes a gas cabinet for storing therein a gas pipe and a gas cylinder connected to the gas pipe, a gas cylinder replacement apparatus and a controller configured to control the gas cylinder replacement apparatus. The gas cylinder replacement apparatus includes a body, a locomotion unit configured to travel in a semiconductor process line, a manipulator including a tool changer, and a vision unit installed at a distal end of the manipulator. An attachable valve manipulation unit includes a first gripper configured to grip a valve locking device of the gas cylinder. An attachable pipe handling unit includes a second gripper configured to grip the gas pipe.

20 Claims, 17 Drawing Sheets

(56) References Cited

FOREIGN PATENT DOCUMENTS

| | | | | | |
|---|---|---|---|---|---|
| KR | 102112764 | B1 | * | 5/2020 | .............. F17C 13/04 |
| KR | 102112765 | B1 | * | 5/2020 | ....... H01L 21/67017 |
| KR | 102112763 | B1 | * | 6/2020 | .............. F17C 13/04 |
| KR | 102132170 | B1 | * | 7/2020 | .......... B66F 9/07563 |
| KR | 10-2020-0095975 | A | | 8/2020 | |
| KR | 20200095975 | A | * | 8/2020 | ....... H01L 21/67017 |
| KR | 10-2020-0107529 | A | | 9/2020 | |
| KR | 20200107529 | A | * | 9/2020 | ............ B25J 9/0009 |
| KR | 20210110179 | A | * | 9/2021 | ....... H01L 21/67017 |
| KR | 10-2021-0123173 | A | | 10/2021 | |
| KR | 20210123173 | A | * | 10/2021 | ........... E21B 19/155 |
| KR | 10-2022-0008988 | A | | 1/2022 | |
| KR | 20220008988 | A | * | 1/2022 | ....... H01L 21/67017 |
| KR | 10-2022-0105437 | A | | 7/2022 | |
| KR | 20220105437 | A | * | 7/2022 | ............ F17C 13/085 |
| KR | 10-2021-0110179 | B1 | | 1/2023 | |
| KR | 10-2023-0149373 | A | | 10/2023 | |
| KR | 20230149373 | A | * | 10/2023 | ............ F17C 13/045 |
| KR | 102601453 | B1 | * | 11/2023 | ............ F17C 13/084 |
| KR | 10-2023-0164409 | A | | 12/2023 | |
| KR | 20230164409 | A | * | 12/2023 | ............ F17C 13/084 |

OTHER PUBLICATIONS

Lee et al.; KR20200095975A Automated gas supply system and Container coupling method of the automated gas supply system; EPO English Machine Translation; Aug. 11, 2020; pp. 1-37 (Year: 2020).*

Son et al.; KR20230149373A Device for gas supply; EPO English Machine Translation; Oct. 27, 2023; pp. 1-10 (Year: 2023).*

* cited by examiner

GAS CYLINDER REPLACEMENT SYSTEM

CROSS-REFERENCE TO RELATED APPLICATION

This application claims priority to Korean Patent Application No. 10-2024-0050851 filed on Apr. 16, 2024 and Korean Patent Application No. 10-2023-0188989 filed on Dec. 21, 2023 in the Korean Intellectual Property Office, the contents of which in their entirety are herein incorporated by reference.

BACKGROUND

Technical Field

The present disclosure relates to a gas cylinder replacement system.

Description of Related Art

Various gases to be used in a semiconductor manufacturing process may be stored in gas cylinders. Gas cylinders are cylindrical metal containers, the weights of which vary depending on their size and contents. A typical gas cylinder, when filled, generally weighs over 100 kg. The gas cylinders may be periodically replaced as the gases stored within them are consumed, to maintain supplies of the gases needed for the semiconductor manufacturing process. Such gases may be flammable, corrosive, or toxic, and thus may be directly or indirectly harmful to the human body. As such, the potential for gas leakage during cylinder replacement can pose a health threat, such as a risk of musculoskeletal issues and/or respiratory problems, for workers who manually perform the task of replacing gas cylinders.

SUMMARY

A purpose of the present disclosure is to provide a gas cylinder replacement system that may automatically couple or remove a gas pipe and a gas cylinder to or from each other.

Purposes according to the present disclosure are not limited to the above-mentioned purpose. Other purposes and advantages according to the present disclosure that are not mentioned may be understood based on following descriptions, and may be more clearly understood based on embodiments according to the present disclosure. Further, it will be easily understood that the purposes and advantages according to the present disclosure may be realized using means shown in the claims or combinations thereof.

According to some aspects of the present disclosure, there is provided a gas cylinder replacement system comprising a gas cabinet configured to store therein a gas pipe and a gas cylinder connected to the gas pipe, the gas cylinder replacement system further comprising a gas cylinder replacement apparatus and a controller configured to control the gas cylinder replacement apparatus, wherein the gas cylinder replacement apparatus includes a body including a first surface and a second surface different from each other, a locomotion unit installed on the second surface and configured to travel in a semiconductor process line, a manipulator installed on the first surface and including a tool changer, a vision unit installed at a distal end of the manipulator and configured to determine a location of the gas cylinder, and a valve manipulation unit configurable to be attached to or detached from the first surface, wherein the valve manipulation unit includes a first fastener configured to connect to the tool changer and a first gripper connected to the first fastener and configured to grip and rotate a valve locking device of the gas cylinder, the gas cylinder replacement apparatus further comprising a pipe handling unit configurable to be attached to or detached from the first surface, wherein the pipe handling unit includes a second fastener configured to connect to the tool changer, a second gripper connected to the second fastener and configured to grip a connector of the gas pipe, and a gear configured to rotate the second gripper.

According to some aspects of the present disclosure, there is provided a gas cylinder replacement system comprising a gas cabinet configured to store therein a gas pipe and a gas cylinder removed from the gas pipe, the gas cylinder replacement system further comprising a gas cylinder replacement apparatus and a controller configured to control the gas cylinder replacement apparatus, wherein the gas cylinder replacement apparatus includes a body including a first surface and a second surface different from each other, a locomotion unit installed on the second surface and configured to travel in a semiconductor process line, a manipulator installed on the first surface and including a tool changer, a vision unit installed at a distal end of the manipulator and configured to determine a location of the gas cylinder, and a valve manipulation unit configurable to be attached to or detached from the first surface, wherein the valve manipulation unit includes a first fastener configured to connect to the tool changer and a first gripper connected to the first fastener and configured to grip and rotate a valve locking device of the gas cylinder, the gas cylinder replacement apparatus further comprising a pipe handling unit configurable to be attached to or detached from the first surface, wherein the pipe handling unit includes a second fastener configured to connect to the tool changer, a second gripper connected to the second fastener and configured to grip a connector of the gas pipe, a gear configured to rotate the second gripper, and gasket replacement means connected to the second fastener and configured to replace a gasket installed in the gas pipe.

According to some aspects of the present disclosure, there is provided a gas cylinder replacement system comprising a gas cabinet configured to store therein a gas pipe and a gas cylinder, wherein the gas cabinet includes gas pipe storage, pneumatic coupler storage, and endcap storage, the gas cylinder replacement system further comprising a gas cylinder replacement apparatus and a controller configured to control the gas cylinder replacement apparatus, wherein the gas cylinder replacement apparatus includes a body including a first surface and a second surface different from each other, a locomotion unit installed on the second surface and configured to travel in a semiconductor process line, a manipulator installed on the first surface and including a tool changer, a vision unit installed at a distal end of the manipulator and configured to determine a location of the gas cylinder, and a valve manipulation unit configurable to be attached to or detached from the first surface, wherein the valve manipulation unit includes a first fastener configured to connect to the tool changer and a first gripper connected to the first fastener and configured to grip and rotate a valve locking device of the gas cylinder, the gas cylinder replacement apparatus further comprising a pipe handling unit configurable to be attached to or detached from the first surface, wherein the pipe handling unit includes a second fastener configured to connect to the tool changer, a second gripper connected to the second fastener and configured to grip a connector of the gas pipe, a gear configured to rotate the second gripper, gasket replacement means connected to the second fastener and configured to replace a gasket installed in the gas pipe, and cleaning means connected to the second fastener and configured to clean the gas pipe.

BRIEF DESCRIPTION OF DRAWINGS

The above and other aspects and features of the present disclosure will become more apparent by describing in detail some embodiments thereof with reference to the attached drawings, in which.

DETAILED DESCRIPTIONS

Figure 1:
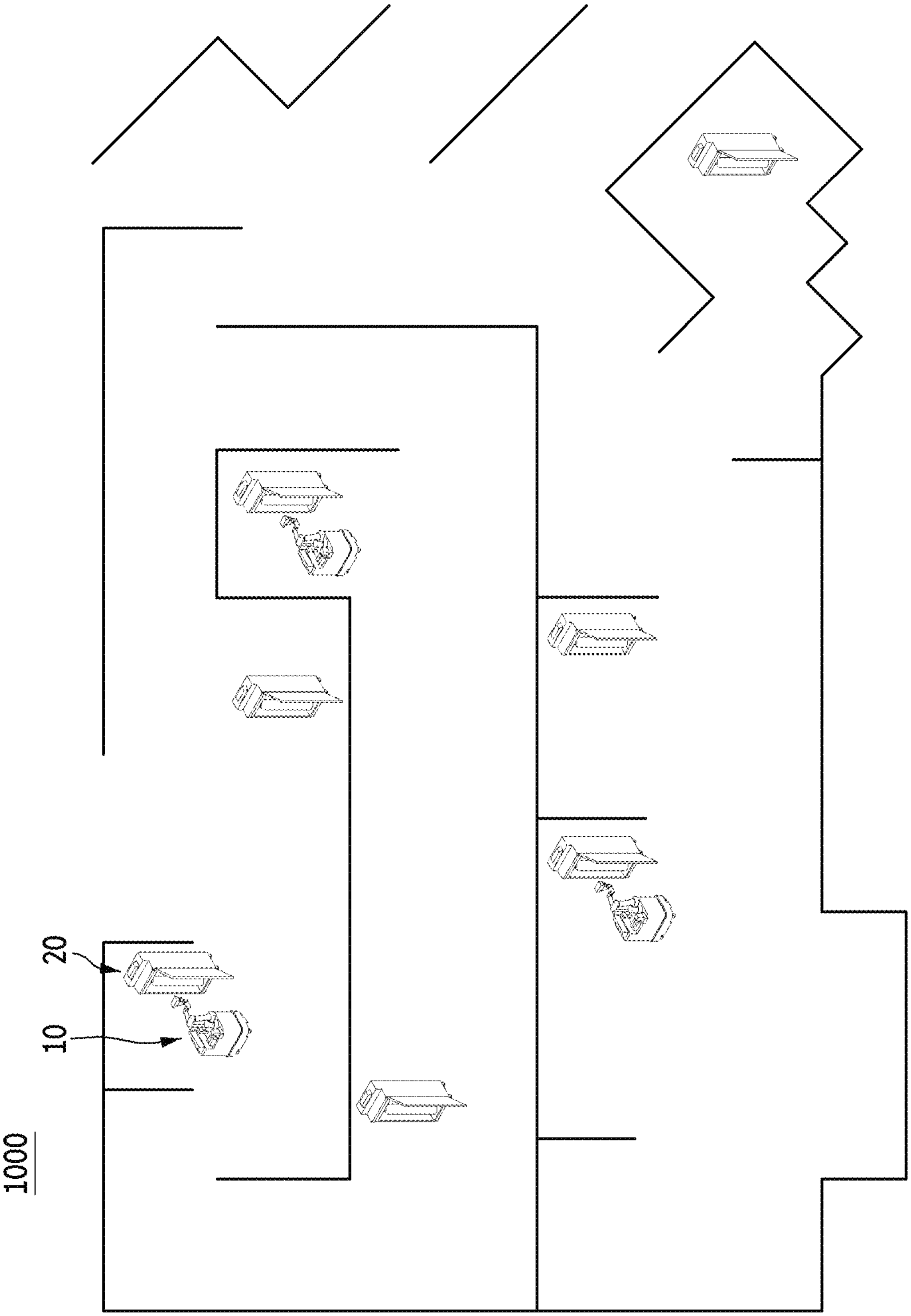
FIG. 1 is a diagram showing a semiconductor process line featuring a gas cylinder replacement system according to some embodiments of the present disclosure.

Throughout the specification, when a component is described as "including" a particular element or group of elements, it is to be understood that the component is formed of only the element or the group of elements, or the element or group of elements may be combined with additional elements to form the component, unless the context indicates otherwise. The term "consisting of," on the other hand, indicates that a component is formed only of the element(s) listed.

Ordinal numbers such as "first," "second," "third," etc. may be used simply as labels of certain elements, steps, etc., to distinguish such elements, steps, etc. from one another. Terms that are not described using "first," "second," etc., in the specification, may still be referred to as "first" or "second" in a claim. In addition, a term that is referenced with a particular ordinal number (e.g., "first" in a particular claim) may be described elsewhere with a different ordinal number (e.g., "second" in the specification or another claim).

The present disclosure now will be described more fully hereinafter with reference to the accompanying drawings, in which various embodiments are shown. The invention may, however, be embodied in many different forms and should not be construed as limited to the example embodiments set forth herein. These example embodiments are just that—examples—and many implementations and variations are possible that do not require the details provided herein. It should also be emphasized that the disclosure provides details of alternative examples, but such listing of alternatives is not exhaustive. Furthermore, any consistency of detail between various examples should not be interpreted as requiring such detail—it is impracticable to list every possible variation for every feature described herein. The language of the claims should be referenced in determining the requirements of the invention.

It is to be understood that when an element is referred to as being "connected" or "coupled" to or "on" another element, it can be directly connected or coupled to or on the other element or intervening elements may be present. In contrast, when an element is referred to as being "directly connected" or "directly coupled" to another element, or as "contacting" or "in contact with" another element (or using any form of the word "contact"), there are no intervening elements present at the point of contact.

Hereinafter, embodiments of the present disclosure are described in detail with reference to the attached drawings. The same reference numerals are used for the same components in the drawings, and duplicate descriptions thereof are omitted.

FIG. 1 is a diagram showing a semiconductor process line 1000 featuring a gas cylinder replacement system according to some embodiments of the present disclosure.

Referring to FIG. 1, the semiconductor process line 1000 may include a gas cylinder replacement apparatus 10 and a gas cabinet 20 that stores therein a gas cylinder.

Although not shown, various semiconductor equipment to perform a semiconductor manufacturing process may be installed in the semiconductor process line 1000. The semiconductor equipment may include the gas cabinet 20 where the gas cylinder is stored. Gas used in the semiconductor manufacturing process may be stored in the gas cylinder.

Multiple gas cabinets 20 may be installed in the semiconductor process line. The gas cabinet 20 may store a gas pipe and the gas cylinder therein. When the gas stored in the gas cylinder is exhausted, the gas cylinder may be replaced. In other words, the gas cylinder inside the gas cabinet 20 may be periodically replaced to supply the gas required for the semiconductor process. When a fully used gas cylinder is replaced with a new gas cylinder, the gas pipe and the used gas cylinder are removed from each other, and the gas pipe and the new gas cylinder may be fastened to each other.

The gas cylinder replacement apparatus 10 may move inside the semiconductor process line 1000. The gas cylinder replacement apparatus 10 may operate in an unattended manner. The gas cylinder replacement apparatus 10 may remove or couple the gas cylinder and the gas pipe from or to each other when the gas cylinder stored in the gas cabinet 20 is replaced. The gas cylinder replacement apparatus 10 may perform opening and closing of a valve locking device of the gas cylinder. The gas cylinder replacement apparatus 10 may remove or replace a gasket of the gas pipe. The gas cylinder replacement apparatus 10 may fasten or remove an endcap to or from the gas cylinder.

A gas cylinder replacement system (such as gas cylinder replacement system 1 of FIG. 13) according to some embodiments of the present disclosure includes the gas cylinder replacement apparatus 10, so that a replacement task of the gas cylinder in the gas cabinet 20 may be automated. For gas cylinder replacement, the gas cylinder replacement apparatus 10 may use machine-operable tools to fasten or remove the gas pipe and the gas cylinder to or from each other, rather than the worker using hand-operated tools to fasten or remove the gas pipe and the gas cylinder to or from each other.

Furthermore, the gas cylinder replacement apparatus 10 can include a body to which appropriate machine-operable tools can be attached, so that the gas cylinder replacement apparatus 10 can carry those tools along with it to locations of gas cylinders that need to be replaced. The gas cylinder replacement apparatus 10 can detach and use such tools as needed during gas cylinder replacement, reattaching them when they are not in use. As a result, rather than being limited to a particular gas cabinet 20, the gas cylinder replacement apparatus 10 can service multiple, non-colocated gas cabinets 20 of semiconductor process line 1000.

Figure 2:
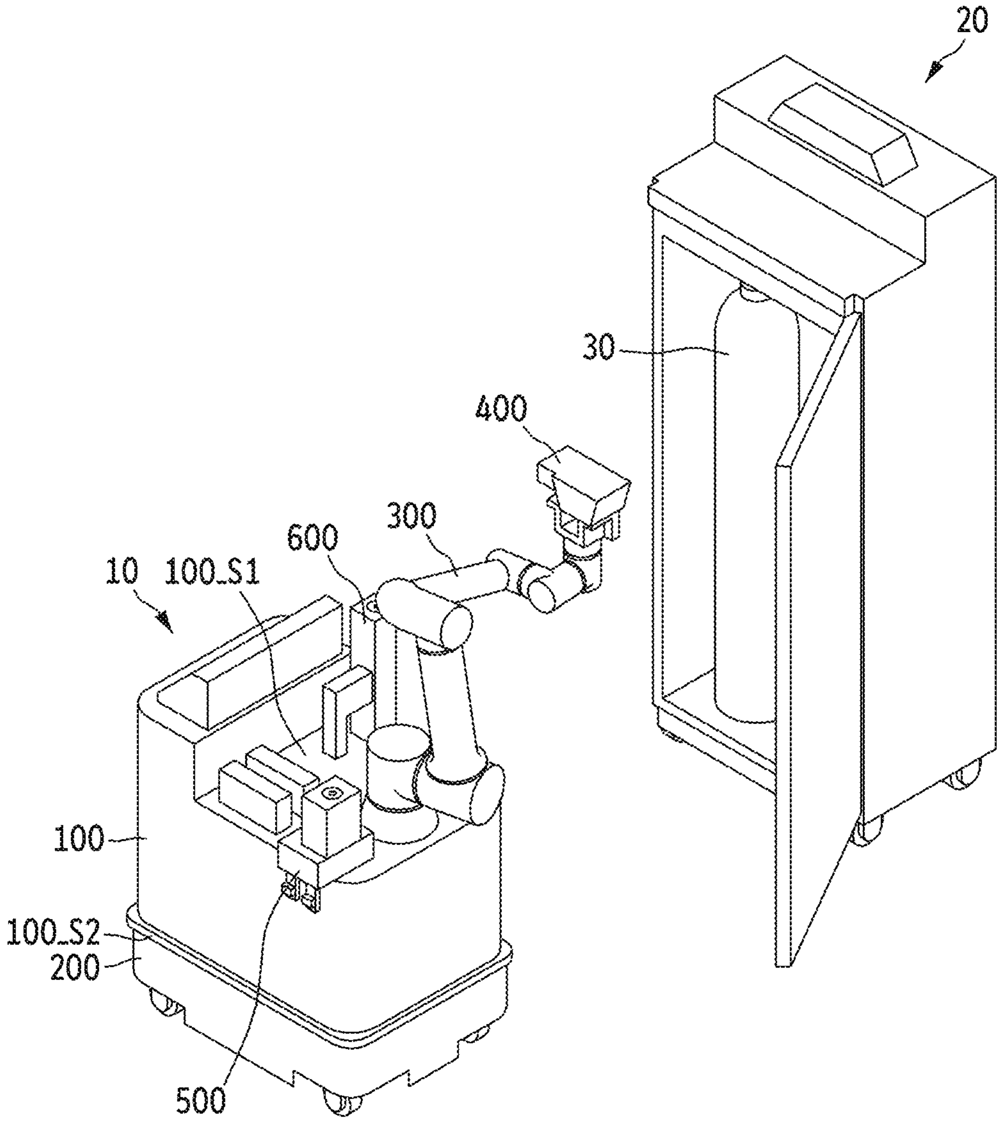
FIG. 2 is a diagram illustrating a gas cylinder replacement system according to some embodiments of the present disclosure.
Figure 11:
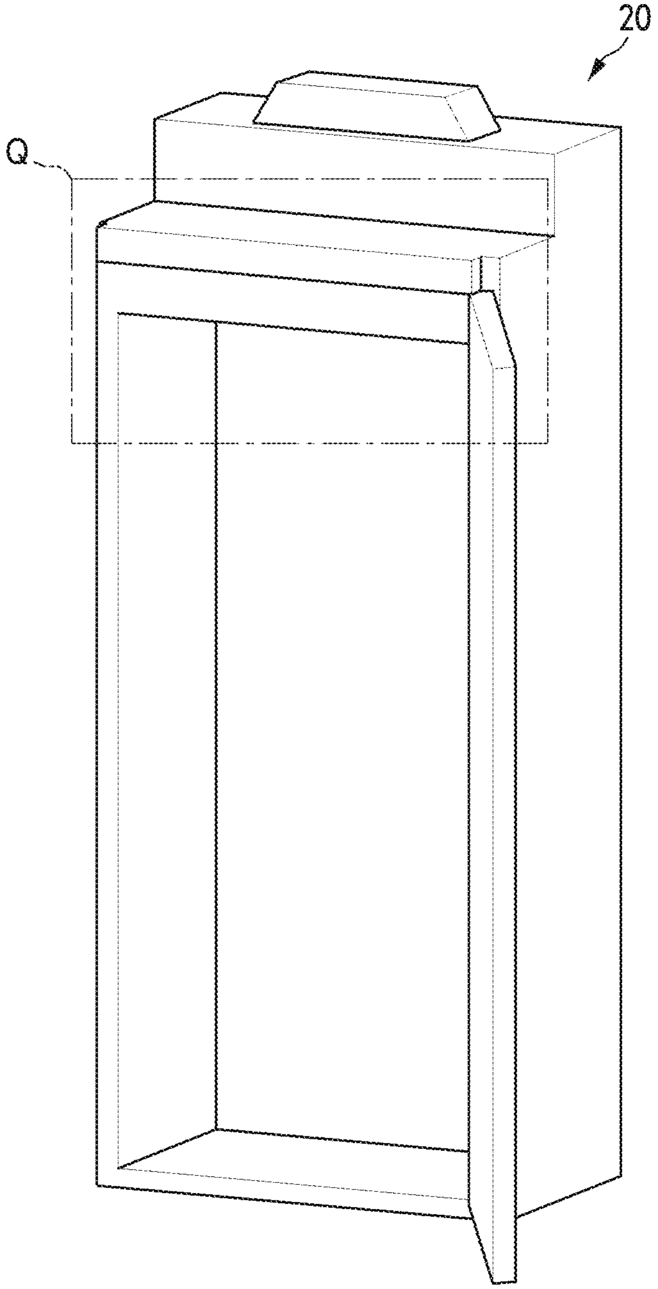
FIG. 11 and FIG. 12 are diagrams illustrating aspects of a gas cabinet according to some embodiments of the present disclosure.
Figure 12:
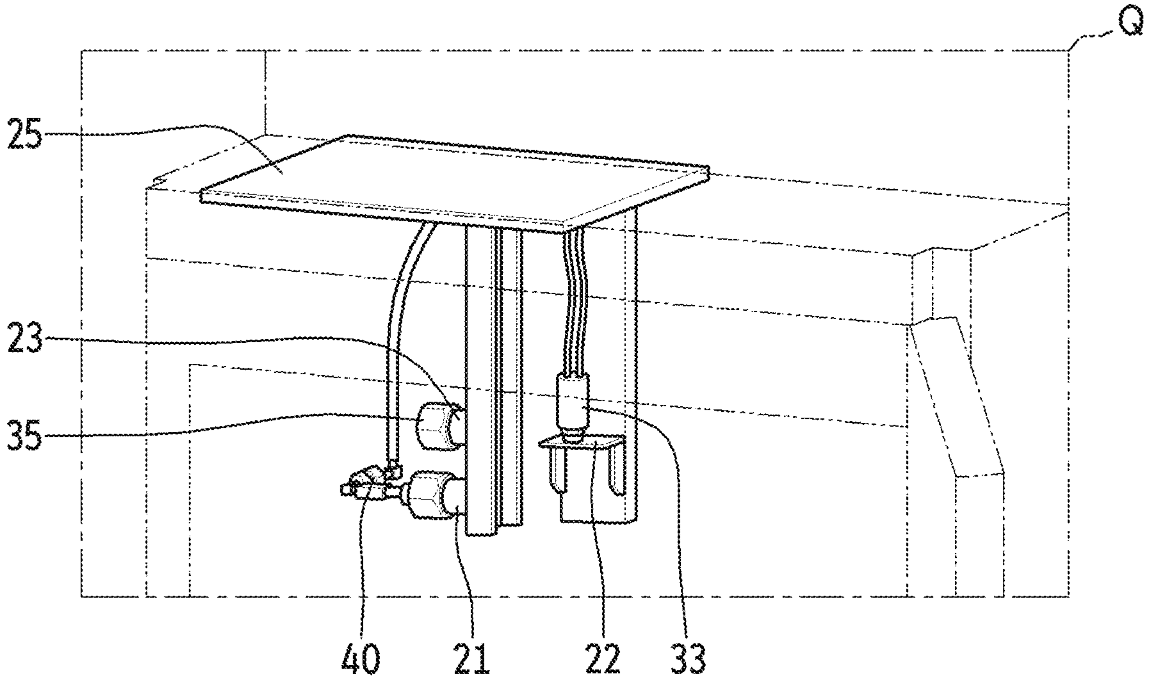
Figure 13:
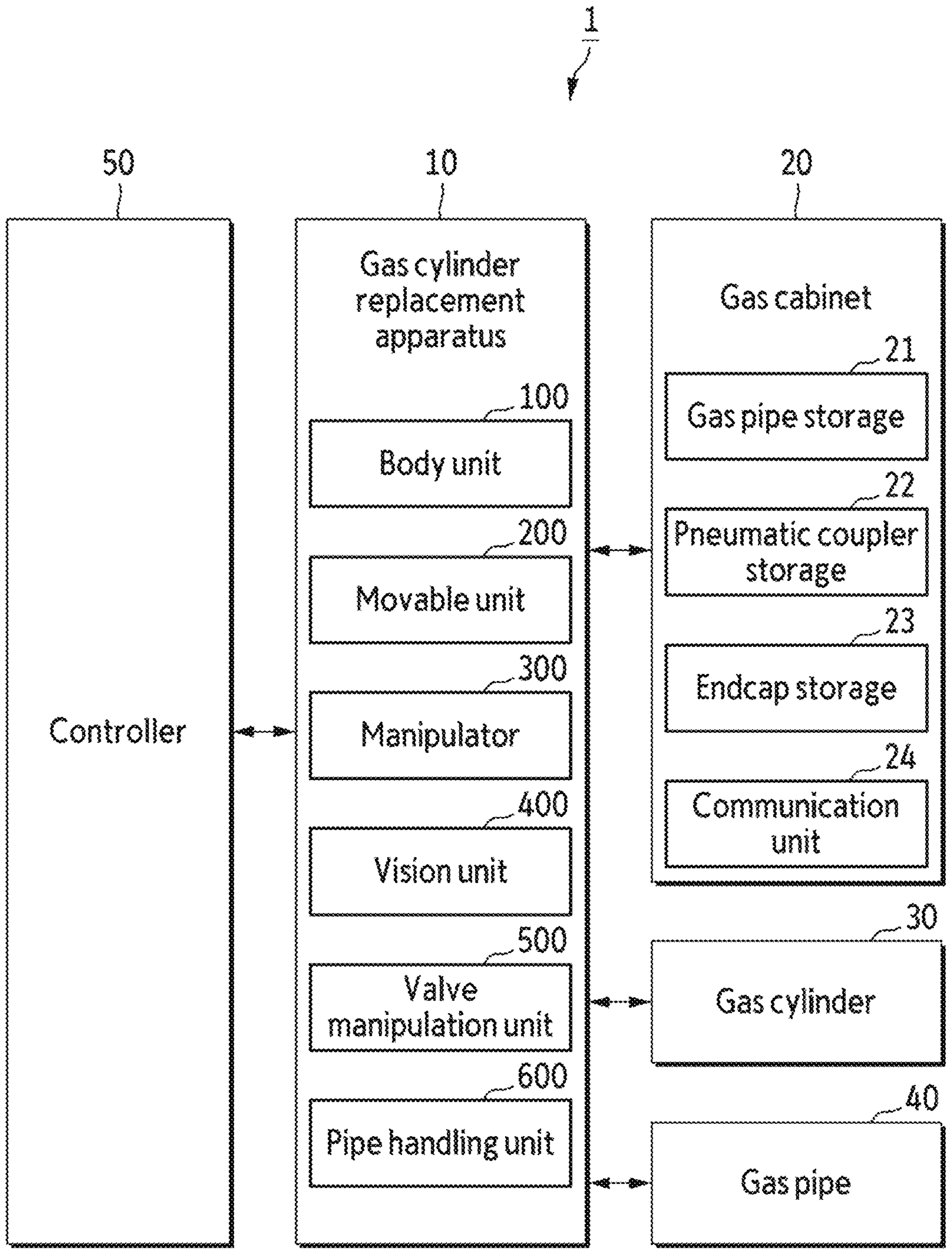
FIG. 13 is a diagram illustrating aspects of the gas cylinder replacement system of FIG. 2 according to some embodiments of the present disclosure.

FIG. 2 is a diagram illustrating a gas cylinder replacement system according to some embodiments of the present disclosure. FIGS. 3 to 10 are diagrams illustrating aspects of a gas cylinder replacement apparatus according to some embodiments of the present disclosure. FIG. 11 and FIG. 12 are diagrams illustrating aspects of a gas cabinet according to some embodiments of the present disclosure. FIG. 12 is an enlarged view of a region Q of FIG. 11. FIG. 13 is a diagram illustrating aspects of the gas cylinder replacement system of FIG. 2 according to some embodiments of the present disclosure.

Referring to FIGS. 2 to 13, the gas cylinder replacement system 1 according to some embodiments of the present disclosure may include a gas cylinder 30, a gas pipe 40, a gas cabinet 20, the gas cylinder replacement apparatus 10, and a controller 50.

The gas cylinder 30 and the gas pipe 40 may be stored in the gas cabinet 20.

The gas cylinder 30 may include a gas pipe receiving portion 32 connected to the gas pipe 40 and a valve locking device 31. The gas pipe 40 may include a connector 45 connected to the gas cylinder 30.

The gas pipe 40 may be inserted into the gas pipe receiving portion 32, so that the gas cylinder 30 and the gas pipe 40 may be fastened to each other. Alternatively, the gas pipe receiving portion 32 and the gas pipe 40 may be removed from each other so that the gas cylinder 30 and the gas pipe 40 may be removed from each other.

An endcap 35 of the gas pipe receiving portion 32 may be fastened or removed to or from each other. A pneumatic coupler 33 may be fastened to or removed from the valve locking device 31.

The controller 50 can be configured to conduct overall control of gas cylinder replacement operations of the gas cylinder replacement system 1. In this context, the controller 50 can control the gas cylinder replacement apparatus 10. The controller 50 can include one or more of at least one central processing unit (CPU) configured to execute computer program instructions to perform various processes and methods, memory devices, such as read only memory (ROM) and random access memory (RAM) configured to access and store data and information and computer program instructions, input/output (I/O) devices configured to provide input and/or output to the central processing unit (e.g., keyboard, mouse, display, speakers, printers, modems, network cards, etc.), and storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium) where data and/or instructions can be stored, a power source that provides an appropriate alternating current (AC) or direct current (DC) to power one or more components of the controller, and a bus that allows communication among the various disclosed components of the controller. The controller 50 can include wired and/or wireless communication interfaces for communicating with other entities (such as the gas cylinder replacement apparatus 10 and the gas cabinet 20) of the gas cylinder replacement system 1 via wired and/or wireless communication network connections.

Referring to FIG. 2, the gas cylinder replacement apparatus 10 may include a body 100, a locomotion unit 200, a manipulator 300, a vision unit 400, a valve manipulation unit 500, and a pipe handling unit 600.

The body 100 may include multiple surfaces. The multiple surfaces may include a first surface 100_S1 and a second surface 100_S2 that is opposite the first surface 100_S1. In some embodiments, the first surface 100_S1 may be a top surface of the body 100, and the second surface 100_S2 may be a bottom surface of the body 100. In FIG. 2, the body 100 is shown in a shape of a cube or rectangular parallelepiped. However, embodiments of the present disclosure are not limited thereto. The body 100 may be a body of the gas cylinder replacement apparatus 10. The locomotion unit 200, the manipulator 300, the valve manipulation unit 500, and the pipe handling unit 600, which will be described later, may be installed in or on the body 100.

The locomotion unit 200 may be installed in the body 100. For example, the locomotion unit 200 may be installed on the second surface 100_S2 of the body 100.

The locomotion unit 200 may include wheels and a drive motor. The wheels may be installed at a bottom of the body 100, and may include one or more drive wheels drivable by the drive motor. The locomotion unit 200 may move as a result of rotation of the drive wheels when driven by the drive motor. The locomotion unit 200 may move inside the semiconductor process line 1000 as shown in FIG. 1. The locomotion unit 200 may move to a position in front of the gas cabinet 20 in the semiconductor process line 1000. Since the gas cabinet 20 includes a communication unit (24 in FIG. 13), the gas cabinet may communicate with the gas cylinder replacement apparatus 10. Accordingly, the locomotion unit 200 may move to a position near the gas cabinet 20.

Figure 3:
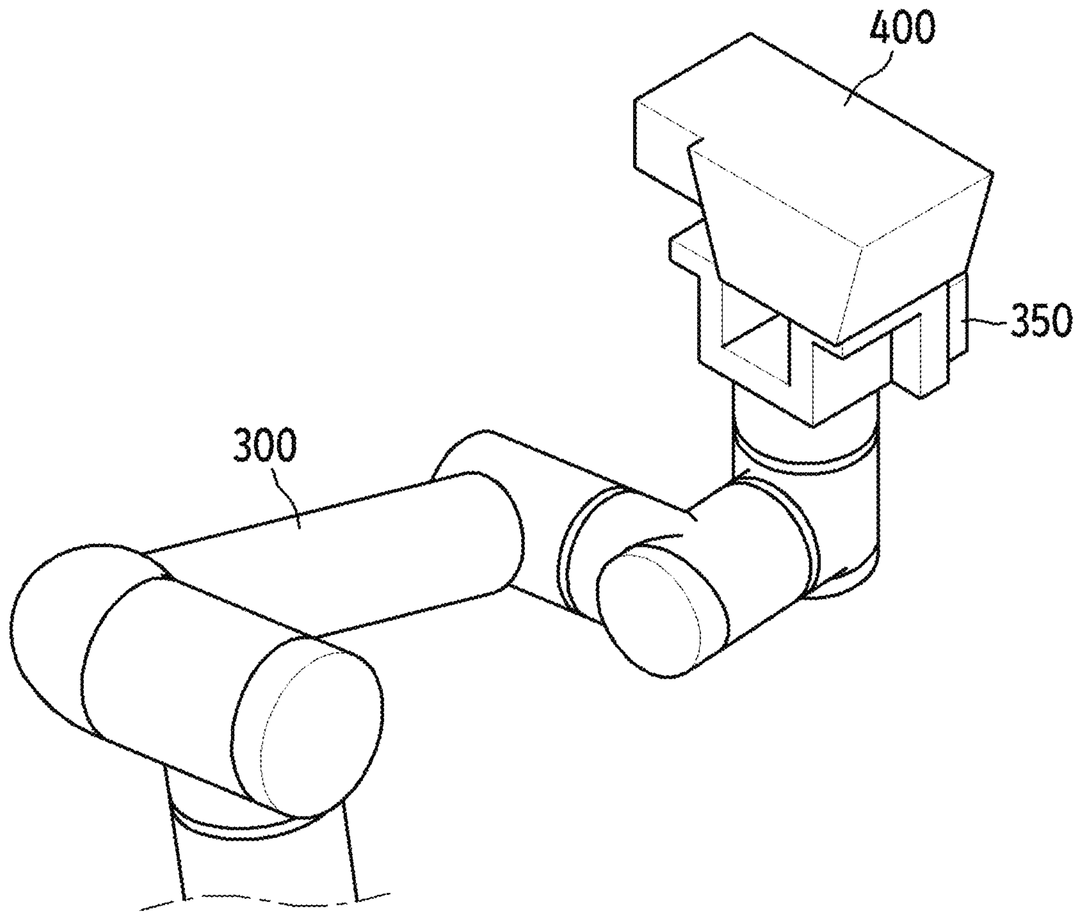
FIGS. 3 to 10 are diagrams illustrating aspects of a gas cylinder replacement apparatus according to some embodiments of the present disclosure.
Figure 4:
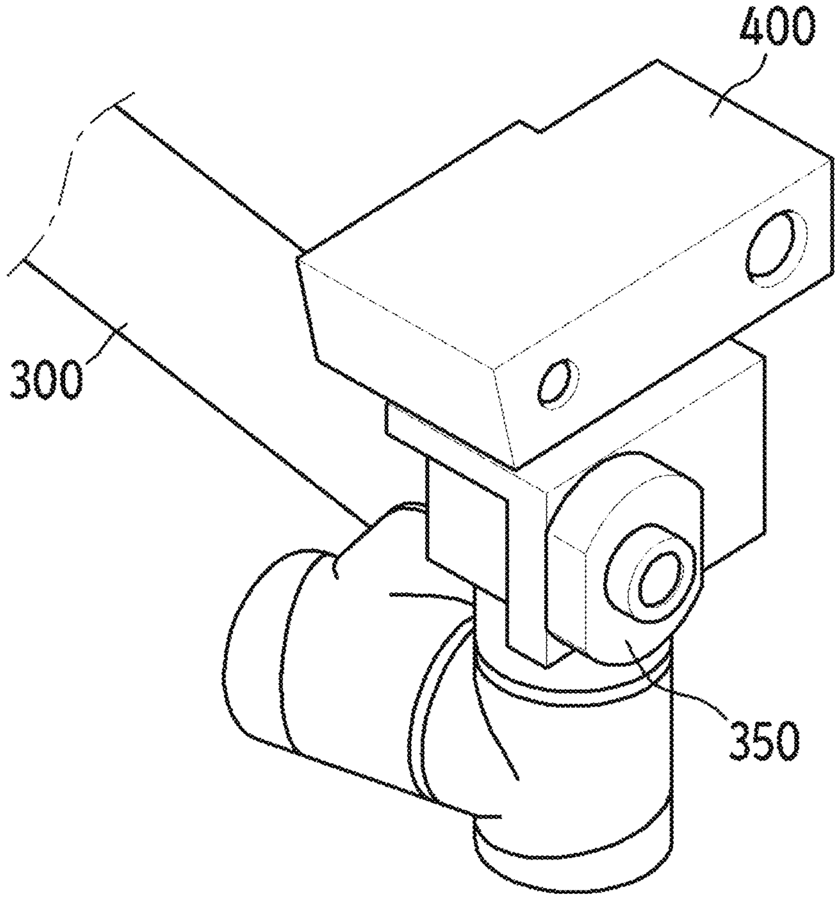

Referring to FIG. 2 to FIG. 4, the manipulator 300 may be installed in the body 100. For example, the manipulator 300 may be installed on the first surface 100_S1 of the body 100.

The manipulator 300 may include multiple joints. The manipulator 300 may have n-degrees of freedom (DOF). In some embodiments, the manipulator 300 may have three or more degrees of freedom. The manipulator 300 may move up and down, left and right, or forward and backward. As described above, the manipulator 300 may be composed of a plurality of axes, allowing a work tool to be positioned to a desired location and in a desired direction.

In some examples, the manipulator 300 may be a multi-axis robot arm including a plurality of arm segments that are rotatable about a plurality of rotation axes and that are connected to each other in series. For instance, the manipulator may be a 6-axis robot arm having six rotation axes.

The manipulator 300 may include a tool changer 350. The tool changer 350 may be installed at a distal end of the manipulator 300 or on the vision unit 400, which will be described later.

The tool changer 350 may be coupled to or removed from another work tool for gas cylinder replacement task. For example, the tool changer 350 may be coupled to the valve manipulation unit 500, which will be described later, such that the gas cylinder replacement task may be performed. Afterwards, the tool changer 350 may be removed from the valve manipulation unit 500 and then may be coupled to the pipe handling unit 600, such that the gas cylinder replacement task may be performed. In some examples, the manipulator 300 may include a power transmission shaft for operating the valve manipulation unit 500 or the pipe handling unit 600 when either is coupled with the tool changer 350. In some examples, the tool changer 350 may include an actuator that can be driven by the power transmission shaft. In some examples, the tool changer 350 can include a second power transmission shaft that can be driven by the power transmission shaft of the manipulator 300. In some examples, the valve manipulation unit 500 and the pipe handling unit 600 may include actuators that can be driven by the second power transmission shaft included in the tool changer 350.

The vision unit 400 may be installed at the distal end of the manipulator 300. Although not shown, in some embodiments, the vision unit 400 may be installed on the first surface 100_S1 of the body 100.

The vision unit 400 may measure 3D coordinates and images of an object. For example, the gas cylinder replacement apparatus 10 may move to a position in front of the gas cabinet 20 using the locomotion unit 200. Then, the gas cylinder replacement apparatus 10 may extract a location and an image of the gas cylinder 30 using the vision unit 400.

In some examples, the vision unit 400 can include a camera comprising a lens and an image sensor. In some examples, the vision unit 400 can further include processing circuitry and a memory, and the memory can store instructions executable by the processing circuitry to generate images by processing image sensor data provided by the image sensor.

In some embodiments, the vision unit 400 and the tool changer 350 may be installed to face in the same direction. For example, both the vision unit 400 and the tool changer 350 may face the gas cylinder 30. The image and the location of the gas cylinder 30 may be extracted using the vision unit 400. Based on the extracted image and location of the gas cylinder 30, the gas cylinder replacement may be performed using the valve manipulation unit 500 or the pipe handling unit 600 connected to the tool changer 350.

Figure 5:
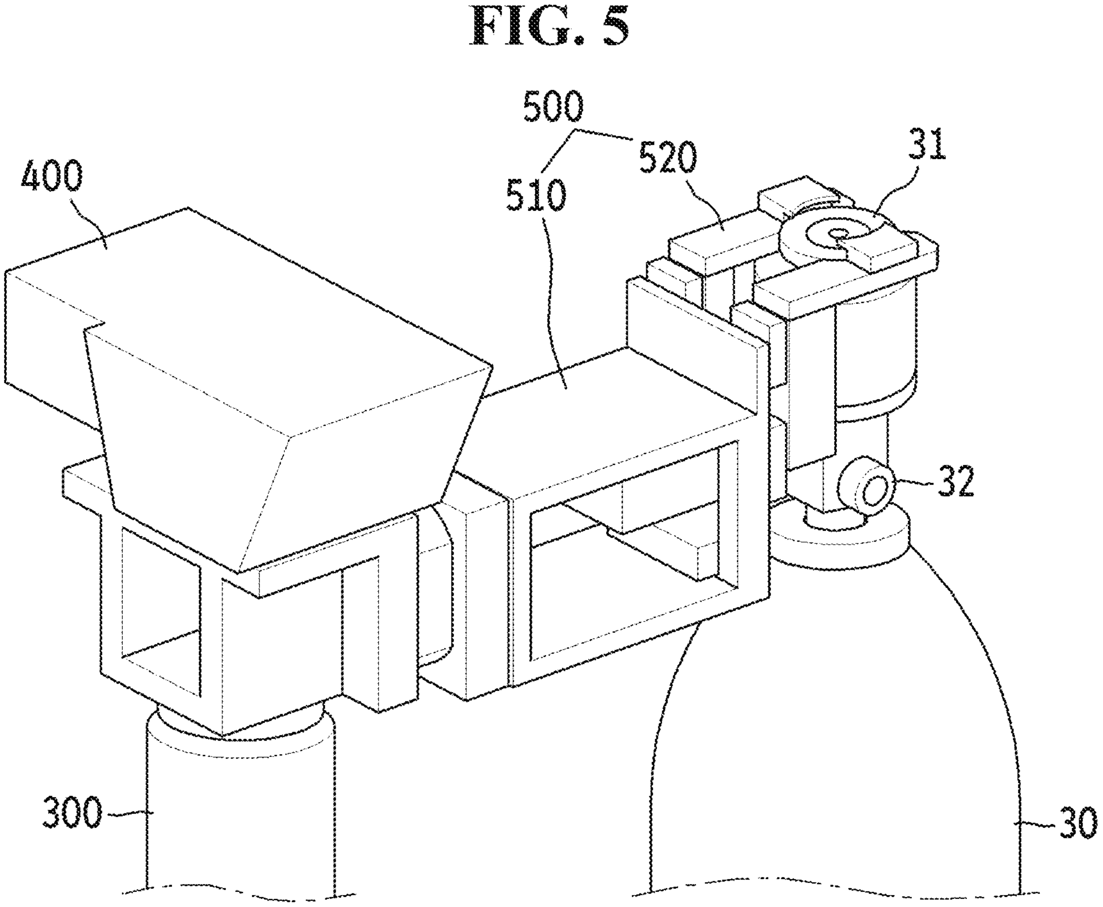
Figure 6:
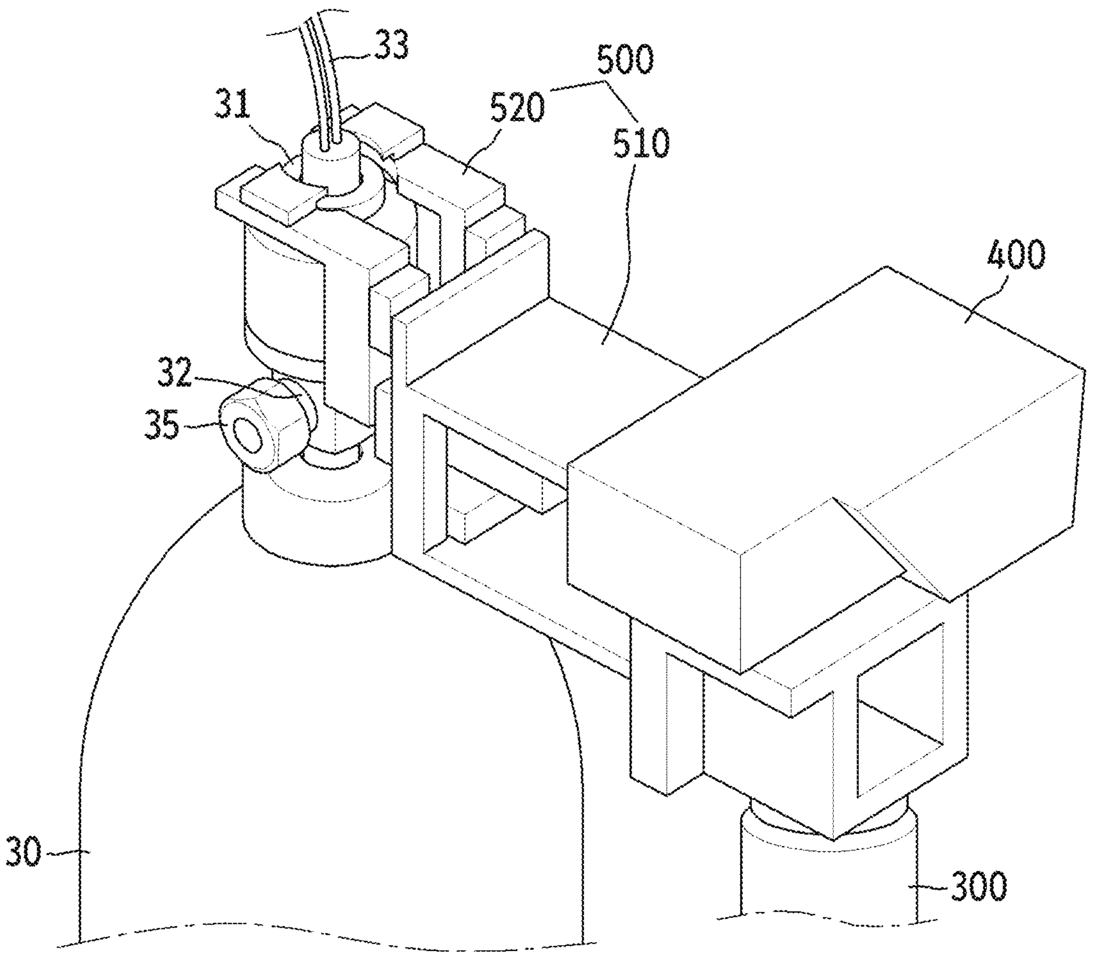
Figure 7:
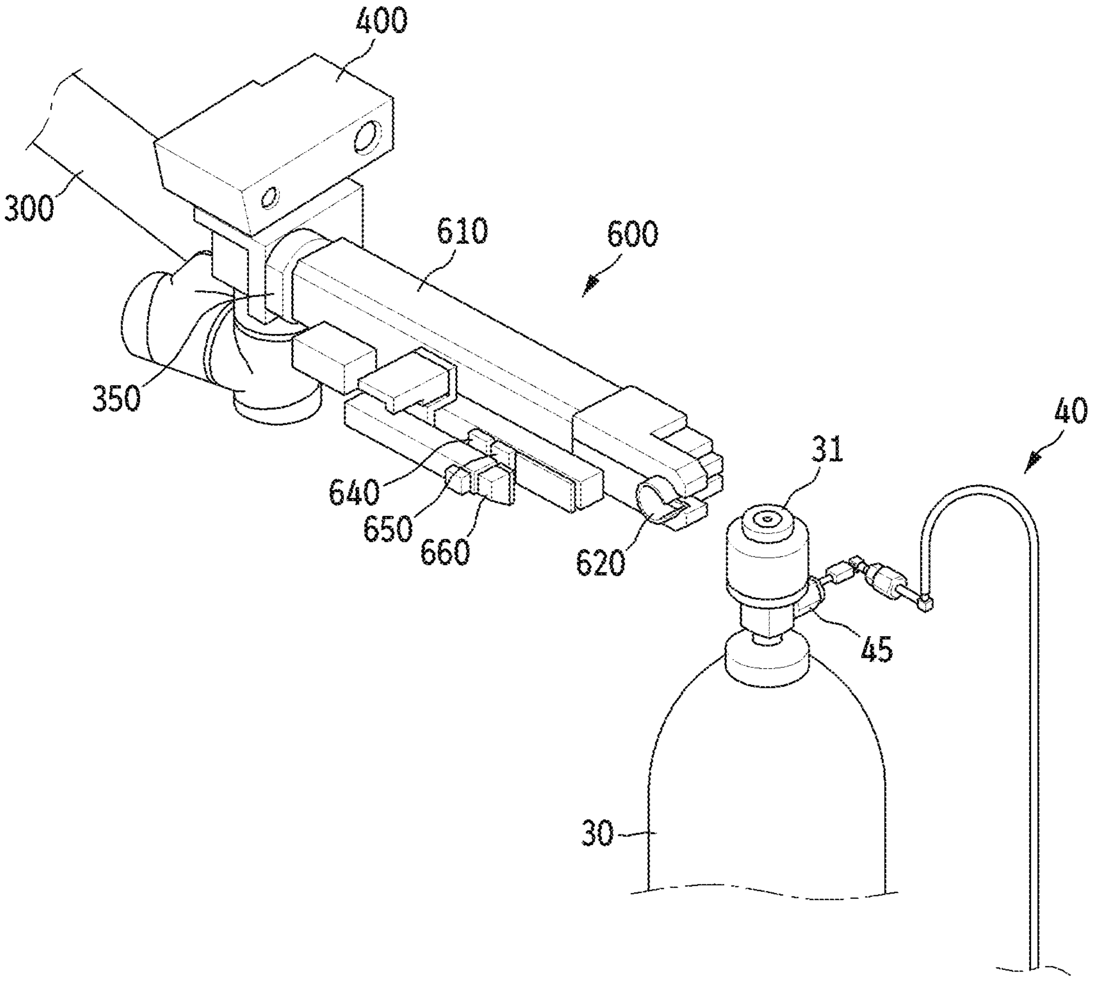

Referring to FIG. 2 and FIGS. 5 to 6, the valve manipulation unit 500 may be installed in the body 100. For example, the valve manipulation unit 500 may be installed on the first surface 100_S1 of the body 100.

The valve manipulation unit 500 may be installed in an attachable or detachable manner to or from the body 100. When the gas cylinder replacement apparatus 10 moves inside the semiconductor process line 1000, the valve manipulation unit 500 may be attached to the body 100. When the gas cylinder replacement apparatus 10 performs the gas cylinder replacement task while being positioned in front of the gas cabinet 20, the valve manipulation unit 500 may be detached from the body 100. Specifically, when the gas cylinder replacement task is in progress, the manipulator 300 may couple the valve manipulation unit 500 attached to the body 100 to the tool changer 350.

The valve manipulation unit 500 may include a first fastener 510 and a first gripper 520.

The first fastener 510 may be coupled to the tool changer 350 or removed therefrom. The manipulator 300 may couple or remove the first fastener 510 and the tool changer 350 to or from each other. When the gas cylinder replacement task is not in progress, the first fastener 510 may be removed from the tool changer 350. When the gas cylinder replacement task is performed, the first fastener 510 may be coupled to the tool changer 350. The first fastener 510 may include one or more connected plates and connecting rods or posts, and may include a lock or other securing mechanism configured to attach and detach from the tool changer 350, the first gripper 520, or other components.

The first gripper 520 may be connected to the first fastener 510. The first gripper 520 may grip each of objects of various sizes. The first gripper 520 may be capable of rotation in a clockwise direction and a counterclockwise direction. In some examples, the first gripper 520 may rotate in a substantially horizontal plane. In other words, the first gripper 520 may be able to grip an object and rotate the object in a clockwise or counterclockwise direction about a substantially vertical axis.

The first gripper 520 may grip the valve locking device 31 of the gas cylinder 30. For example, the manipulator 300 may operate to move the first gripper 520 to the valve locking device 31. The first gripper 520 may rotate the valve locking device 31 in a clockwise or counterclockwise direction while gripping the valve locking device 31. In some examples, when the first gripper 520 rotates the valve locking device 31 clockwise while gripping the valve locking device 31, the valve locking device 31 may be opened (unlocked), and when the first gripper 520 rotates the valve locking device 31 counterclockwise while gripping the valve locking device 31, the valve locking device 31 may be closed (locked).

In some examples, the first gripper 520 may include a clamping mechanism. In some examples, the clamping mechanism can be operated by driving an actuator included in the valve manipulation unit 500. In some examples, the actuator may be driven by a power transmission shaft included in the tool changer 350.

When the gas cylinder valve is a pneumatically driven valve, the first gripper 520 may grip the pneumatic coupler 33 connected to the valve locking device 31.

The first gripper 520 may grip the pneumatic coupler 33. While first gripper 520 is gripping the pneumatic coupler 33, the manipulator 300 operates to remove the valve locking device 31 and the pneumatic coupler 33 from each other. Alternatively, while the first gripper 520 is gripping the pneumatic coupler 33, the manipulator 300 may operate to connect the valve locking device 31 and the pneumatic coupler 33 to each other.

Referring to FIG. 2 and FIGS. 7 to 10, the pipe handling unit 600 may be installed in the body 100. For example, the pipe handling unit 600 may be installed on the first surface 100_S1 of the body 100.

The pipe handling unit 600 may be installed so as to be attached or detached to or from the body 100. When the gas cylinder replacement apparatus 10 moves inside the semiconductor process line 1000, the pipe handling unit 600 may be attached to the body 100. When the gas cylinder replacement apparatus 10 performs the gas cylinder replacement task while being positioned in front of the gas cabinet 20, the pipe handling unit 600 may be detached from the body 100. Specifically, when the gas cylinder replacement task is in progress, the manipulator 300 may couple the pipe handling unit 600 attached to the body 100 to the tool changer 350.

The pipe handling unit 600 may include a second fastener 610, a second gripper 620, a gear 630, gasket replacement means 640, cleaning means 650, and a vision sensor 660.

The second fastener 610 may be coupled to the tool changer 350 or removed therefrom. The manipulator 300 may couple or remove the second fastener 610 and the tool changer 350 to or from each other. When the gas cylinder replacement task is not in progress, the second fastener 610 may be removed from the tool changer 350. When the gas cylinder replacement task is performed, the second fastener 610 may be coupled to the tool changer 350.

The second gripper 620 and the gear 630 may be connected to the second fastener 610. For example, an end of the second fastener 610 may be slidably attached to and detached from a housing that houses the second gripper 620 and gear 630, or may be attached and detached in other ways.

The second gripper 620 may grip the gas pipe 40. For example, the second gripper 620 may grip or grab the connector 45 of the gas pipe 40. In some examples, the second gripper 620 may include a cylindrical clamp or socket, or other fixed or adjustable gripper or grabber that has a shape that conforms to the connector 45 to stabilize and manipulate the connector 45. In some examples, the cylindrical clamp can be operated by driving an actuator included in the pipe handling unit 600. In some examples, the actuator may be driven by a power transmission shaft included in the tool changer 350.

Figure 8:
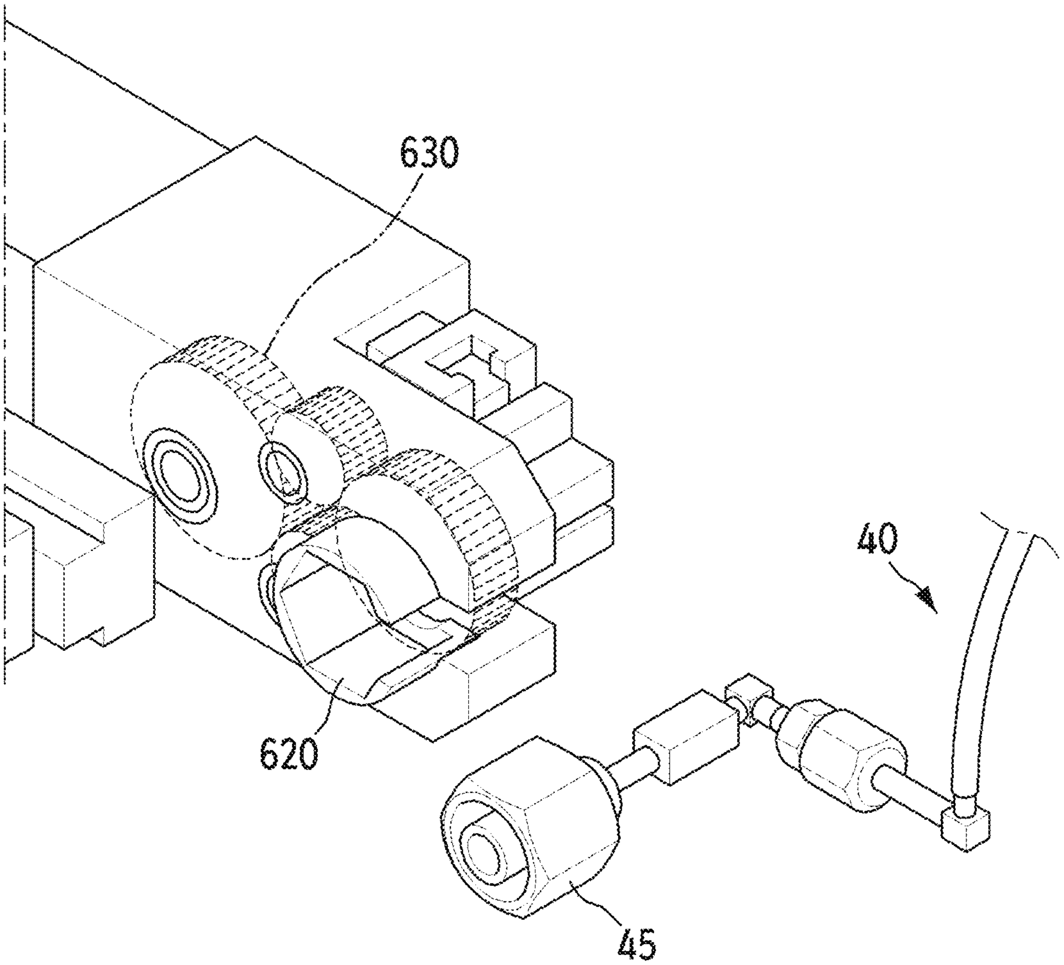
Figure 9:
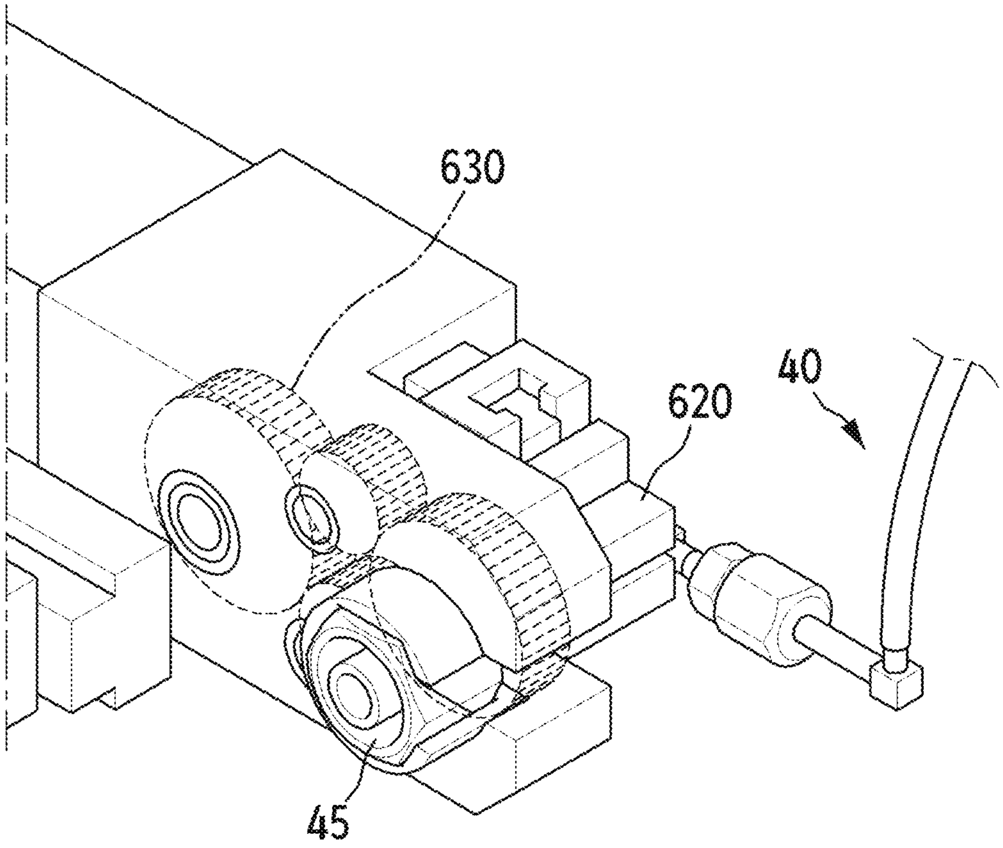
Figure 10:
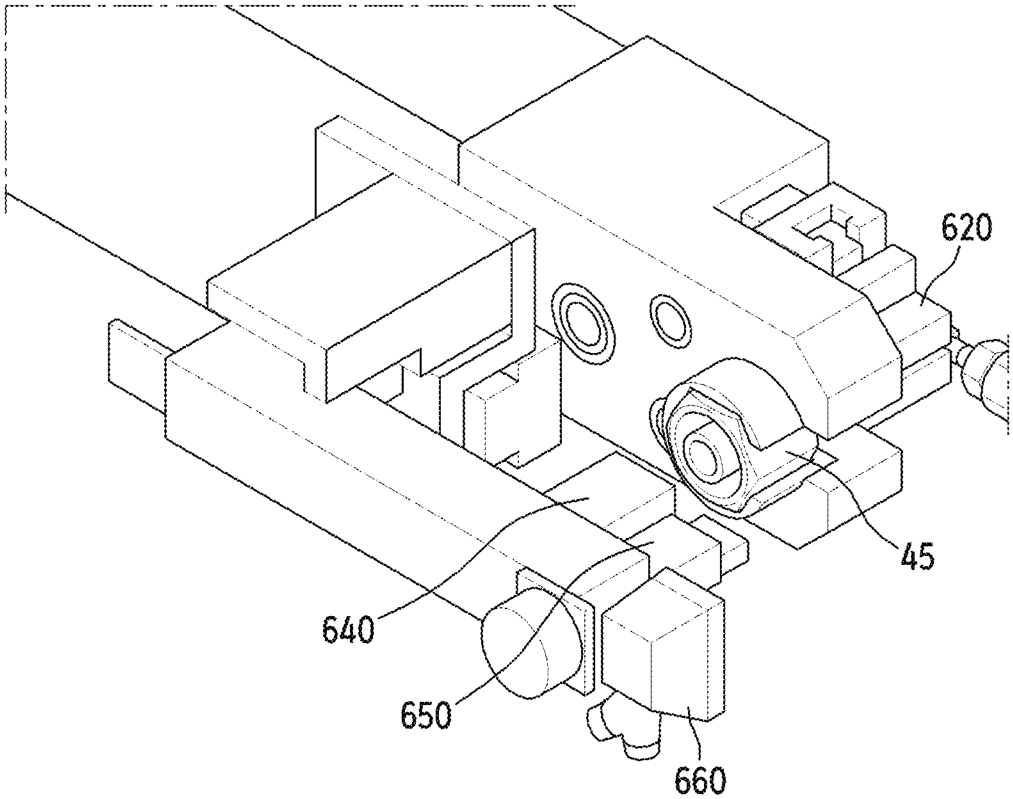

As shown in FIG. 8 and FIG. 9, the manipulator 300 operates to move the second gripper 620 to the connector 45 of the gas pipe 40. Then, the second gripper 620 may grip the connector 45 of the gas pipe 40.

The gear 630 may weaken or strengthen the coupling between the gas pipe 40 and the gas cylinder 30. After the second gripper 620 grips the connector 45 of the gas pipe 40, the gear 630 may rotate the second gripper 620. When the second gripper 620 rotates by the gear 630, the connector 45 may rotate. For example, the connector 45 may be a nut. The gear 630 rotates the second gripper 620 to tighten or loosen the nut. The coupling force between the gas cylinder 30 and the gas pipe 40 may vary depending on a forward or backward direction in which the gear 630 rotates the second gripper 620. Ultimately, the gear 630 may fasten or remove the gas pipe 40 and the gas cylinder 30 to or from each other.

The second gripper 620 may have an open gas pipe receiving portion. Therefore, after fastening the gas cylinder 30 and the gas pipe 40 to each other, the second gripper 620 may be removed from the gas pipe 40 through the gas pipe receiving portion.

The second gripper 620 may grip an endcap (such as endcap 35 of FIG. 6). For example, when the endcap 35 is fastened to the gas pipe receiving portion 32 of the gas cylinder 30, the second gripper 620 may grip the endcap 35 and remove the endcap 35 from the gas cylinder 30. Conversely, the second gripper 620 may grip the endcap 35, and may fasten the endcap 35 to the gas pipe receiving portion 32.

The gasket replacement means 640, the cleaning means 650 and the vision sensor 660 may be connected to the second fastener 610. The gasket replacement means 640, the cleaning means 650 and the vision sensor 660 may be installed adjacent to each other.

The gasket replacement means 640 may replace a gasket inserted into the connector 45 of the gas pipe 40. For example, the gasket replacement means 640 may remove the gasket from the connector 45. Alternatively, the gasket replacement means 640 may insert the gasket into the connector 45. In some examples, the gasket replacement means 640 may include actuatable forceps. In some examples, the actuatable forceps can be operated by driving an actuator included in the pipe handling unit 600. In some examples, the actuator may be driven by a power transmission shaft included in the tool changer 350.

When the gas pipe 40 is removed from the gas cylinder 30, the gasket already inserted into the connector 45 may has been contaminated with the gas. In this case, the gasket replacement means 640 may remove the gasket from the connector 45. After the gasket is removed, the cleaning means 650 may clean the gas pipe 40. The cleaning means 650 may wash salts produced by residual gas in the gas pipe 40. In some examples, the cleaning means 650 may include an actuatable brush. In some examples, the actuatable brush can be operated by driving an actuator included in the pipe handling unit 600. In some examples, the actuator may be driven by a power transmission shaft included in the tool changer 350.

When replacing the used gas cylinder with a new gas cylinder 30, the gasket replacement means 640 may insert the gasket into the connector 45 of the gas pipe 40.

The vision sensor 660 may determine whether the gasket has been inserted into the connector, and a salt contamination amount. The vision sensor 660 may be used to check whether the gasket has been inserted into the connector 45. Additionally, the contamination level of the gas pipe 40 may be measured using the vision sensor 660.

In some examples, the vision sensor 660 can include a camera comprising a lens and an image sensor. In some examples, the vision sensor 660 can further include processing circuitry and a memory, and the memory can store instructions executable by the processing circuitry to generate images by processing image sensor data provided by the image sensor.

Referring to FIGS. 11 to 13, the gas cabinet 20 may include a space for storing therein the gas cylinder 30 and the gas pipe 40. The gas cylinder replacement task may be carried out inside the gas cabinet 20.

The gas cabinet 20 may include gas pipe storage 21, pneumatic coupler storage 22, endcap storage 23, and the communication unit 24.

A plate 25 may be installed at a top of the gas cabinet 20. The gas pipe storage 21, the pneumatic coupler storage 22, and the endcap storage 23 may extend from the plate 25 and may be installed inside the gas cabinet 20.

The gas pipe storage 21 may store therein the gas pipe 40. The gas pipe storage 21 may have a thread. After the gas pipe 40 is removed from the gas cylinder 30, the gas pipe may be stored in the gas pipe storage 21. When the gas pipe 40 is fastened to the gas pipe storage 21, the gas pipe storage may be sealed from the outside, thereby preventing foreign material from invading the same.

The gas pipe 40 stored in the gas pipe storage 21 may be fastened to a new gas cylinder 30.

The pneumatic coupler storage 22 may store therein the pneumatic coupler 33. When the pneumatic coupler 33 is removed from the valve locking device 31, the manipulator 300 operates so that the first gripper 520 stores the pneumatic coupler 33 in the pneumatic coupler storage 22.

The pneumatic coupler 33 stored in the pneumatic coupler storage 22 may be connected to the valve locking device 31 when replacing the gas cylinder 30.

The endcap storage 23 may store therein the endcap 35. When the endcap 35 has been removed from the gas cylinder 30, the manipulator 300 operates such that the second gripper 620 stores the endcap 35 in the endcap storage 23.

The endcap 35 stored in the endcap storage 23 may be fastened to the gas pipe receiving portion 32 of the gas cylinder 30 when replacing the gas cylinder 30.

The communication unit 24 may communicate with the gas cylinder replacement apparatus 10. The gas cylinder replacement apparatus 10 may determine the location of the gas cabinet 20 based on a communicating result with the communication unit 24.

Referring to FIG. 13, the controller 50 may control the gas cylinder replacement apparatus 10.

The controller 50 may control the locomotion unit 200, the manipulator 300, the vision unit 400, the valve manipulation unit 500, and the pipe handling unit 600.

The controller 50 may control the locomotion unit 200 to move to a position in front of the gas cabinet 20. The controller 50 may control the vision unit 400 to measure the 3D coordinates and images of the gas cylinder 30.

When removing the gas cylinder 30 and the gas pipe 40 from each other, the controller 50 may control the manipulator 300 to connect the tool changer 350 and the first fastener 510 to each other. Afterwards, the controller 50 may control the first gripper 520 to grip the valve locking device 31 and rotate the valve locking device 31 clockwise or counterclockwise so that the valve locking device 31 is closed (locked). The controller 50 may control the first gripper 520 to grip the pneumatic coupler 33 and remove the pneumatic coupler 33 from the valve locking device 31. The controller 50 may control the manipulator 300 so that the tool changer 350 and the second fastener 610 are connected to each other. Afterwards, the controller 50 may control the second gripper 620 to grip the connector 45 of the gas pipe 40 and rotate the gear 630 so that the gas cylinder 30 and the gas pipe 40 are removed from each other. When the gas pipe 40 has been removed therefrom, the controller 50 may control the pipe handling unit 600 to remove the gasket of the gas pipe 40. The controller 50 may control the cleaning means 650 to clean the gas pipe 40. The controller 50 may control the manipulator 300 so that the removed gas pipe 40 is stored in the gas pipe storage 21. The controller 50 may control the removed pneumatic coupler 33 to be stored in the pneumatic coupler storage 22. The controller 50 may control the second gripper 620 to grip the endcap 35, rotate the gear 630 to remove the gas cylinder 30 and the endcap 35 from each other, and store the removed endcap 35 in the endcap storage 23.

When fastening the gas cylinder 30 and the gas pipe 40 to each other, the controller 50 may control the manipulator 300 so that the tool changer 350 and the second fastener 610 are connected to each other. Afterwards, the controller 50 may control the second gripper 620 to grip the connector 45 of the gas pipe 40, and connect the gas pipe 40 and the gas cylinder 30 to each other, and then rotate the gear 630 to fasten the gas pipe 40 and the gas cylinder 30 to each other. Afterwards, the controller 50 may control the manipulator 300 so that the tool changer 350 and the first fastener 510 are coupled to each other. The controller 50 may control the first gripper 520 to grip the valve locking device 31 and rotate the valve locking device 31 in a clockwise or counterclockwise direction to open (unlock) the valve locking device 31. In some embodiments, before opening the valve locking device 31, the controller 50 may control the first gripper 520 to grip the pneumatic coupler 33 and connect the pneumatic coupler 33 and the valve locking device 31 to each other.

Figure 14:
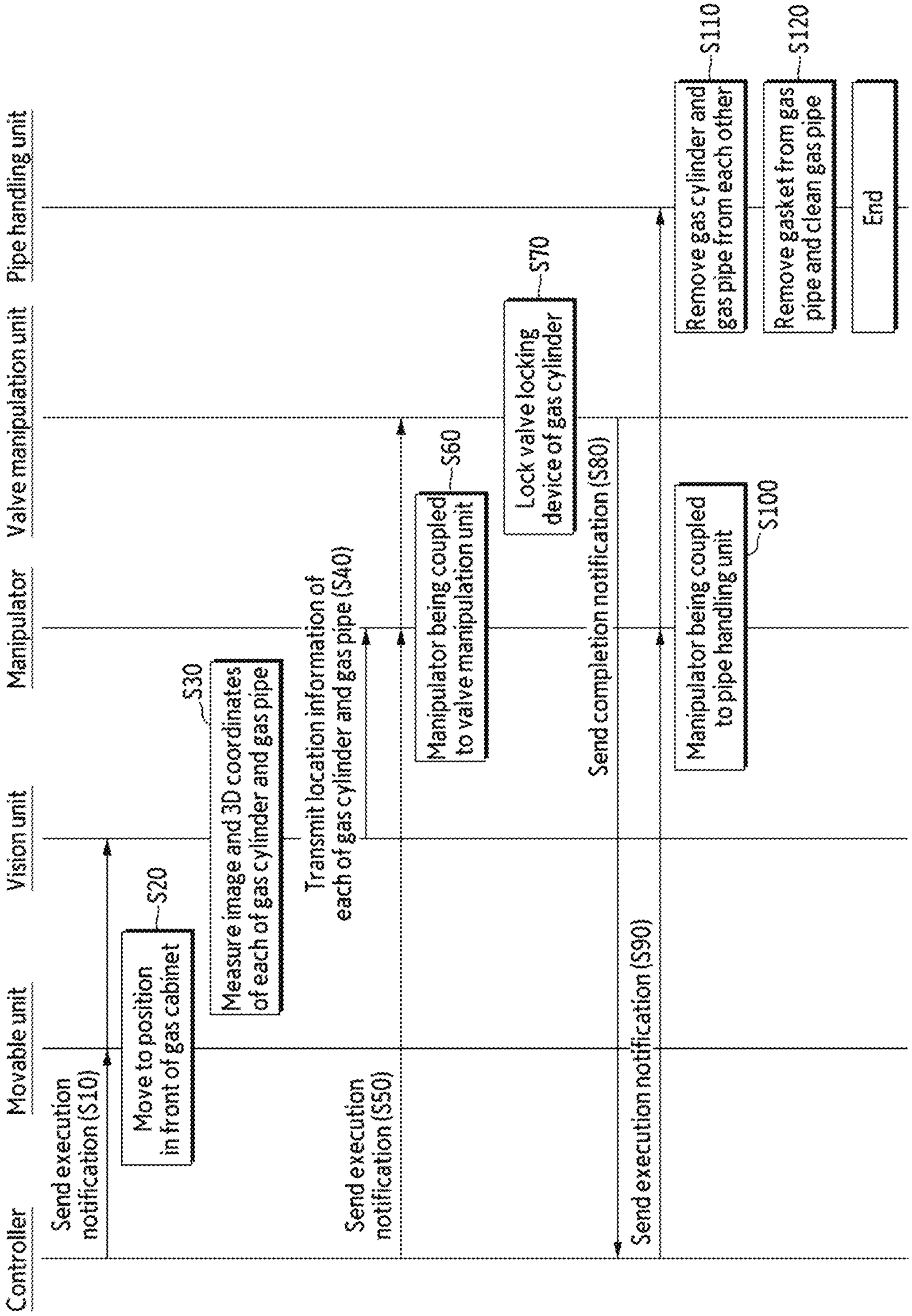
FIG. 14 is a diagram illustrating a process of removing a gas cylinder and a gas pipe from each other using a gas cylinder replacement system according to some embodiments of the present disclosure.

FIG. 14 is a diagram illustrating a process of removing a gas cylinder and a gas pipe from each other using a gas cylinder replacement system according to some embodiments of the present disclosure. For convenience of description, contents duplicate what have been described above with reference to FIGS. 1 to 13 are briefly described or descriptions thereof are omitted.

Referring to FIG. 13 and FIG. 14, the controller 50 sends an execution notification to the locomotion unit 200 and the vision unit 400 in S10. Upon receiving the execution notification, the locomotion unit 200 moves forward to the gas cabinet 20 in S20. When the locomotion unit 200 has moved to a position in front of the gas cabinet 20, the vision unit 400 measures the images and 3D coordinates of the gas cylinder 30 and the gas pipe 40 in S30. The vision unit 400 transmits the location information of the gas cylinder 30 and the gas pipe 40 to the manipulator 300 in S40.

The locomotion unit 200 may move inside the semiconductor process line. The locomotion unit 200 may move to a position in front of the gas cabinet 20 based on a communicating result with the communication unit 24 mounted on the gas cabinet 20. When the locomotion unit 200 has moved to the position in front of the gas cabinet 20, the vision unit 400 installed on the manipulator 300 may measure the image and 3D coordinates of the gas cylinder 30 and the image and 3D coordinates of the gas pipe 40. The position of the locomotion unit 200 may be-re-adjusted based on the images and 3D coordinates of the gas cylinder 30 and the gas pipe 40 measured by the vision unit 400.

Subsequently, the controller 50 sends an execution notification to the manipulator 300 and the valve manipulation unit 500 in S50. Upon receiving the execution notification, the manipulator 300 is coupled to the valve manipulation unit 500 in S60.

For the removal of the gas cylinder 30 and the gas pipe 40 from each other, the manipulator 300 may operate so that the tool changer 350 is coupled to the first fastener 510 of the valve manipulation unit 500.

Subsequently, the valve manipulation unit 500 locks the valve locking device 31 of the gas cylinder 30 in S70.

The valve manipulation unit 500 may grip the valve locking device 31 using the first gripper 520. After the first gripper 520 has gripped the valve locking device 31, the first gripper 520 may rotate the valve locking device 31 in clockwise or counterclockwise direction to close (lock) the valve locking device 31.

In some embodiments, when the valve locking device 31 and the pneumatic coupler 33 have been connected to each other, the first gripper 520 may grip the pneumatic coupler 33. The first gripper 520 may grip each of objects of various sizes. For example, a grip width of the first gripper 520 may be adjusted. Therefore, after the first gripper 520 has gripped the pneumatic coupler 33, the manipulator 300 operates to remove the pneumatic coupler 33 and the valve locking device 31 from each other.

When the valve locking device 31 of the gas cylinder 30 has been locked, the valve manipulation unit 500 sends a completion notification to the controller 50 in S80.

Subsequently, the controller 50 sends an execution notification to the manipulator 300 and the pipe handling unit 600 in S90. Upon receiving the execution notification, the manipulator 300 is coupled to the pipe handling unit 600 in S100.

The manipulator 300 may operate to remove the tool changer 350 and the valve manipulation unit 500 from each other and to couple the tool changer 350 to the second fastener 610 of the pipe handling unit 600.

Next, the pipe handling unit 600 removes the gas cylinder 30 and the gas pipe 40 from each other in S110. Next, the pipe handling unit 600 removes the gasket of the gas pipe 40 therefrom and cleans the gas pipe 40 in S120.

The pipe handling unit 600 may grip the gas pipe 40 coupled to the gas cylinder 30 using the second gripper 620. Specifically, the second gripper 620 may grip the connector 45 of the gas pipe 40. When the second gripper 620 has gripped the connector 45, the pipe handling unit 600 may rotate the second gripper 620 using the gear 630. When the second gripper 620 rotates, the connector 45 rotates, and the coupling between the gas cylinder 30 and the gas pipe 40 may be loosened. Therefore, the gas cylinder 30 and the gas pipe 40 may be removed from each other.

The removed gas pipe 40 may be treated with the gasket replacement means 640 and the cleaning means 650 of the pipe handling unit 600. The gasket inserted into the gas pipe 40 may be contaminated with remaining gas. Therefore, the gasket replacement means 640 may remove the gasket inserted into the gas pipe 40 from the gas pipe. The gas pipe 40 may have the salt on the surface thereof due to the chemical reaction of the gas. Therefore, the gas pipe 40 may be cleaned using the cleaning means 650.

Figure 15:
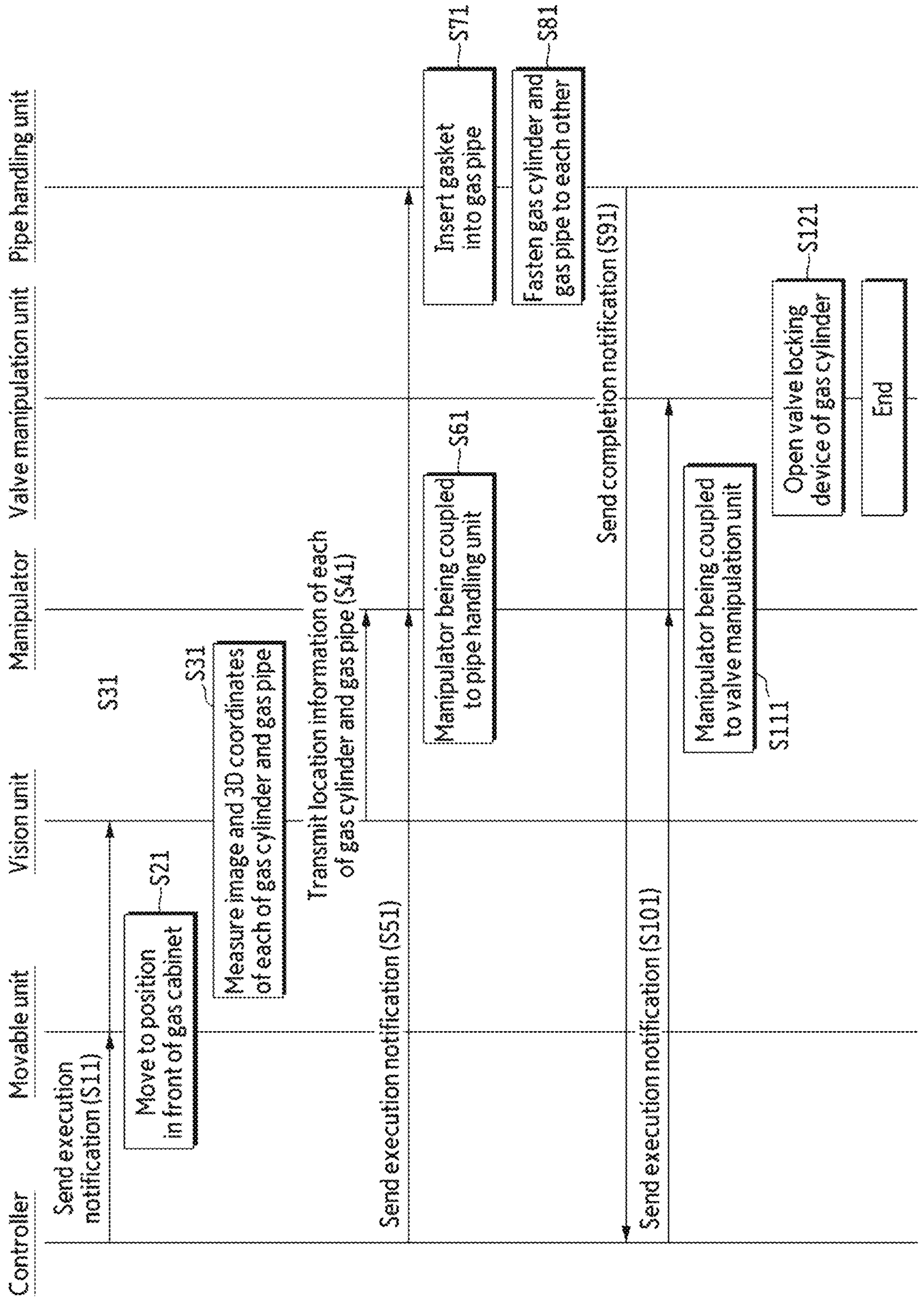
FIG. 15 is a diagram illustrating a process of fastening a gas cylinder and a gas pipe to each other using a gas cylinder replacement system according to some embodiments of the present disclosure.

FIG. 15 is a diagram illustrating a process of fastening a gas cylinder and a gas pipe to each other using a gas cylinder replacement system according to some embodiments of the present disclosure. For convenience of description, contents duplicate with what have been described above with reference too FIGS. 1 to 13 are briefly described or descriptions thereof are omitted.

Referring to FIG. 13 and FIG. 15, the controller 50 sends an execution notification to the locomotion unit 200 and the vision unit 400 in S11. Upon receiving the execution notification, the locomotion unit 200 moves forward to the gas cabinet 20 in S21. When the locomotion unit 200 has moved to a position in front of the gas cabinet 20, the vision unit 400 measures the images and 3D coordinates of the gas cylinder 30 and the gas pipe 40 in S31. The vision unit 400 transmits the location information of the gas cylinder 30 and the gas pipe 40 to the manipulator 300 in S41.

Subsequently, the controller 50 sends an execution notification to the manipulator 300 and the pipe handling unit 600 in S51. Upon receiving the execution notification, the manipulator 300 is coupled to the pipe handling unit 600 in S61.

For fastening the gas cylinder 30 and the gas pipe 40 to each other, the manipulator 300 may operate so that the tool changer 350 is coupled to the second fastener 610 of the pipe handling unit 600.

Next, the pipe handling unit 600 inserts the gasket into the gas pipe 40 in S71, and fastens the gas cylinder 30 and the gas pipe 40 to each other in S81.

The pipe handling unit 600 may insert the gasket into the gas pipe 40 using the gasket replacement means 640. The pipe handling unit 600 may grip the connector 45 of the gas pipe 40 using the second gripper 620. Next, the manipulator 300 operates to connect the gas pipe 40 gripped with the second gripper 620 to the gas cylinder 30. When the gas pipe 40 and the gas cylinder 30 have been connected to each other, the gear 630 may rotate so that the gas pipe 40 is fastened to the gas cylinder 30.

When the gas cylinder 30 and the gas pipe 40 have been fastened to each other, the pipe handling unit 600 sends a completion notification to the controller 50 in S91.

Subsequently, the controller 50 sends an execution notification to the manipulator 300 and the valve manipulation unit 500 in S101. Upon receiving the execution notification, the manipulator 300 is coupled to the valve manipulation unit 500 in S111.

The manipulator 300 may operate to remove the tool changer 350 and the pipe handling unit 600 from each other and to couple the tool changer 350 to the first fastener 510 of the valve manipulation unit 500.

Next, the valve manipulation unit 500 opens the valve locking device 31 of the gas cylinder 30 in S121.

The valve manipulation unit 500 may grip the valve locking device 31 using the first gripper 520. After the first gripper 520 has gripped the valve locking device 31, the first gripper 520 may rotate the valve locking device 31 clockwise or counterclockwise to open (unlock) the valve locking device 31.

In some embodiments, when the valve locking device 31 is configured to be connected to the pneumatic coupler 33, the valve manipulation unit 500 may grip the pneumatic coupler 33 using the first gripper 520. The manipulator 300 may operate to connect the pneumatic coupler 33 gripped with the first gripper 520 to the valve locking device 31.

Various gases to be used in a semiconductor manufacturing process may be stored in gas cylinders. The gas cylinders may be periodically replaced as the gases stored within them are consumed, to maintain supplies of the gases required for the semiconductor manufacturing process. Such gases may be flammable, corrosive, or toxic, and thus may be directly or indirectly harmful to the human body.

If a worker performs gas cylinder replacement manually, the worker directly removes or fastens the gas cylinder and the gas pipe from or to each other, and perform tasks such as opening and closing the valve locking device. The potential for gas leakage during such operations can pose a health threat to the worker due to the hazardous nature of the stored gas. Additionally, the amounts of gases used in semiconductor manufacturing processes—and thus the frequency of gas cylinder replacements-continues to increase. As a result, the labor costs associated with gas cylinder replacements performed manually by workers continue to increase.

Rather than relying on manual operations on the part of a worker, the gas cylinder replacement system 1 according to some embodiments of the present disclosure may automatically fasten or remove the gas pipe and the gas cylinder to or from each other. The gas cylinder replacement system 1 may include the gas cylinder replacement apparatus 10, the gas cabinet 20 that stores therein the gas cylinder 30, and the gas pipe 40. The gas cylinder replacement apparatus 10 may include the body 100, the locomotion unit 200, the manipulator 300, the vision unit 400, the valve manipulation unit 500, and the pipe handling unit 600. The gas cylinder replacement apparatus 10 may move inside the semiconductor process line 1000.

The gas cylinder replacement apparatus 10 may remove the gas cylinder 30 and the gas pipe 40 stored in the gas cabinet 20 from each other without the worker. For example, the valve manipulation unit 500 may lock the valve locking device 31 of the gas cylinder 30 and remove the pneumatic coupler 33 therefrom. Then, the pipe handling unit 600 may grip the connector 45 of the gas pipe 40 and remove the gas pipe 40 and the gas cylinder 30 from each other. Further, the pipe handling unit 600 may grip the endcap 35 fastened to the gas cylinder 30 and then remove the endcap therefrom. The gas cylinder replacement apparatus 10 may store the removed gas pipe 40 in the gas pipe storage 21 installed in the gas cabinet 20. The gas cylinder replacement apparatus 10 may store the removed endcap 35 in the endcap storage 23 installed in the gas cabinet 20. The gas cylinder replacement apparatus 10 may store the removed pneumatic coupler 33 in the pneumatic coupler storage 22 installed in the gas cabinet 20.

The gas cylinder replacement apparatus 10 may fasten the gas cylinder 30 and the gas pipe 40 stored in the gas cabinet 20 to each other without the worker. For example, the gas cylinder replacement apparatus 10 may grip the gas pipe 40 stored in the gas pipe storage 21 and insert the gasket into the gas pipe. Next, after connecting the gas pipe 40 to the gas cylinder 30, the gas pipe 40 and the gas cylinder 30 may be fastened to each other. The gas cylinder replacement apparatus 10 may grip the pneumatic coupler 33 stored in the pneumatic coupler storage 22 and may connect the pneumatic coupler 33 to the valve locking device 31. Thereafter, the gas cylinder replacement apparatus 10 may grip the valve locking device 31 and rotate the valve locking device 31 clockwise or counterclockwise. Therefore, the valve locking device 31 may be opened.

As described above, the removal or fastening operation of the gas cylinder 30 and the gas pipe 40 in the gas cabinet 20 may be automated using the gas cylinder replacement apparatus 10 and the gas cabinet 20 included in the gas cylinder replacement system 1 according to some embodiments. The gas cylinder replacement system 1 may protect worker safety, increase the accuracy and efficiency of gas cylinder replacements, and reduce costs.

Figure 16:
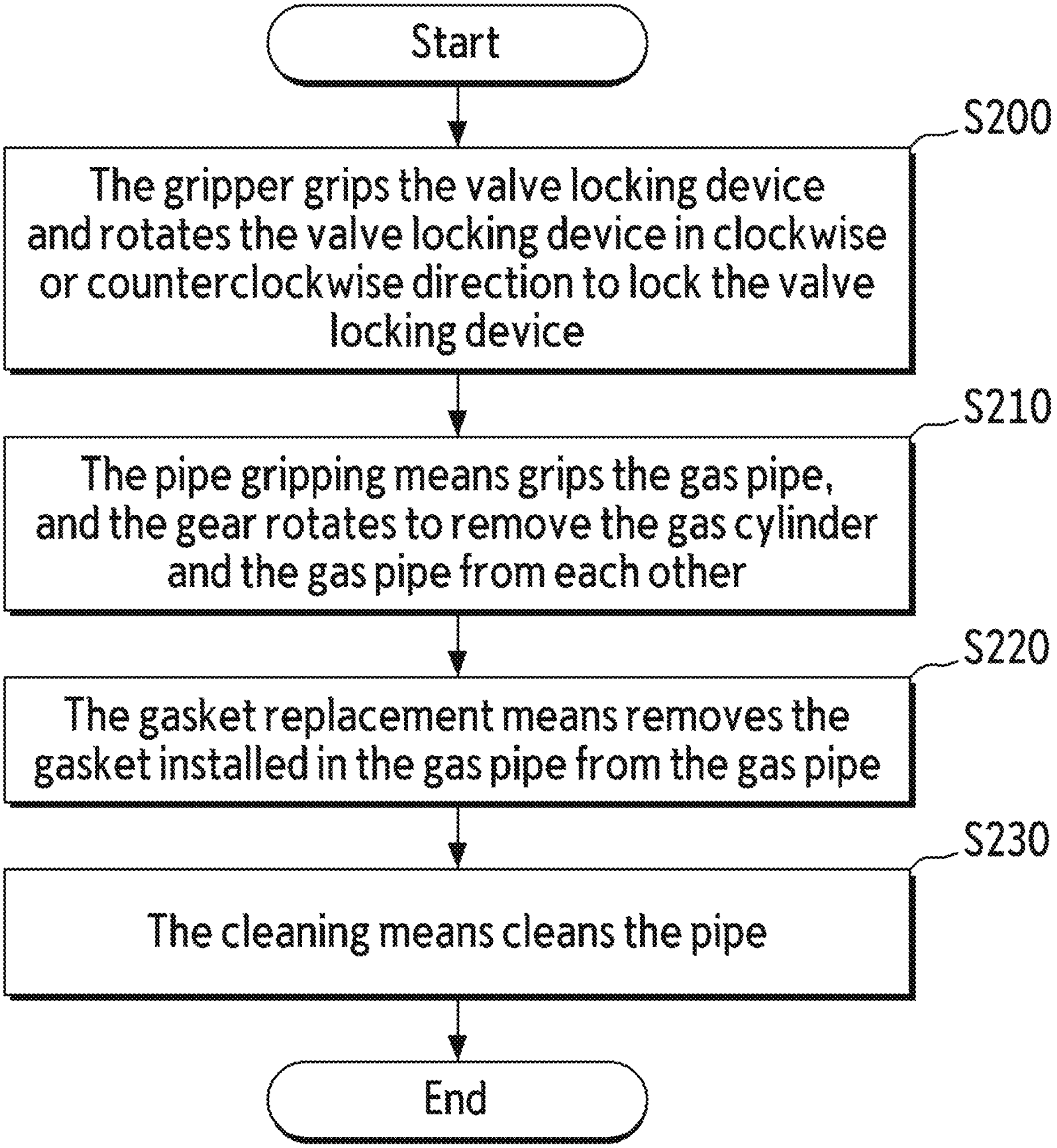
FIG. 16 and FIG. 17 are diagrams illustrating a gas cylinder replacement method according to some embodiments of the present disclosure.
Figure 17:
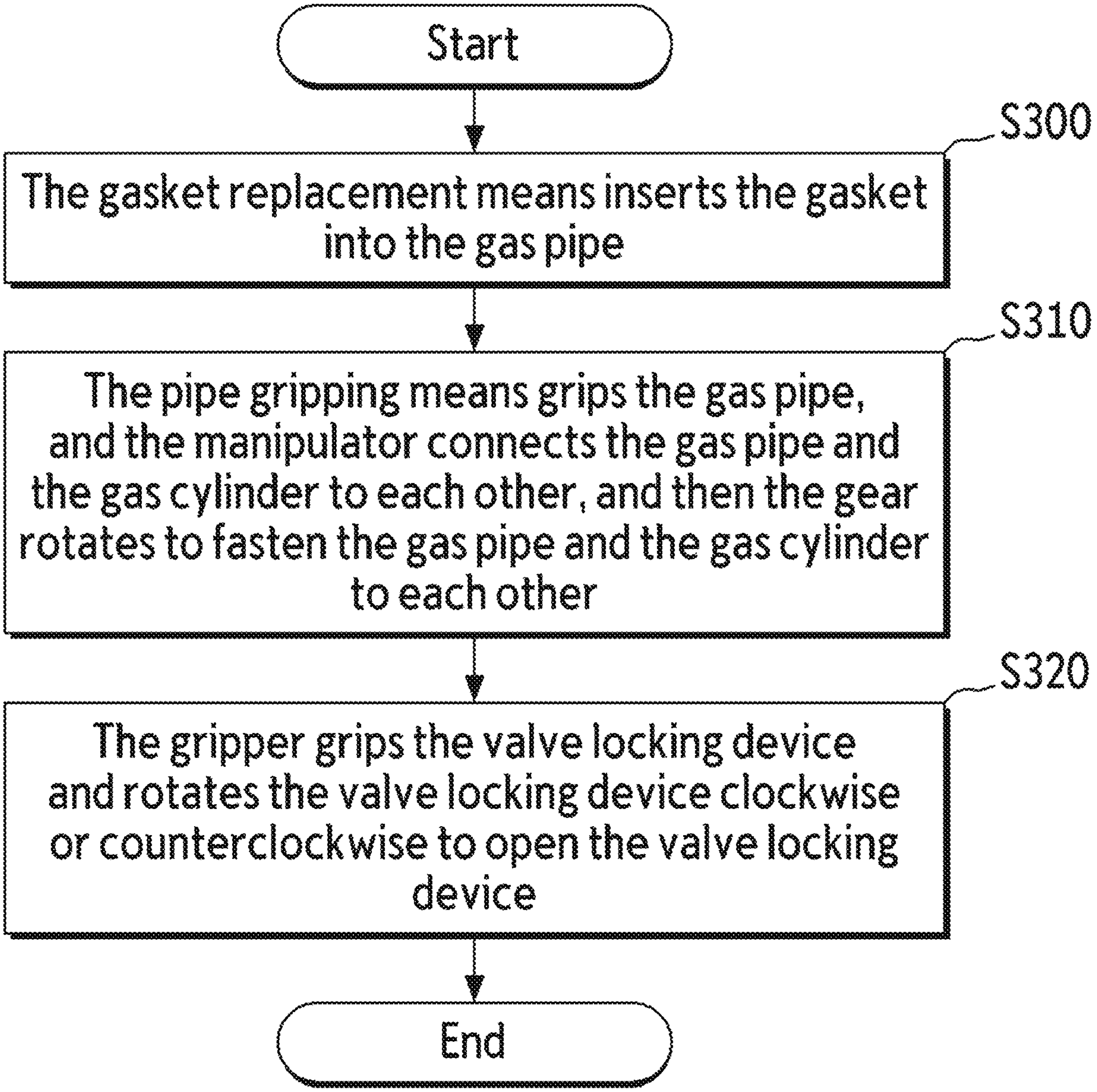

FIG. 16 and FIG. 17 are diagrams illustrating a gas cylinder replacement method according to some embodiments of the present disclosure. The method can include removing a gas cylinder and a gas pipe from each other, and fastening a new gas cylinder and the gas pipe to each other. For convenience of description, contents duplicate with what have been described above with reference to FIGS. 1 to 13 are briefly described or descriptions thereof are omitted.

Operations of the gas cylinder replacement method illustrated by FIGS. 16 and 17 may be completed using a gas cylinder replacement apparatus as described herein, such as the gas cylinder replacement apparatus 10 of FIG. 2. A gas cylinder replacement apparatus used to complete operations of the gas cylinder replacement method illustrated by FIGS. 16 and 17 may include a body including a first surface and a second surface different from each other, a locomotion unit installed on the second surface and configured to travel in a semiconductor process line, a manipulator installed on the first surface and including a tool changer, a vision unit installed at a distal end of the manipulator and configured to determine a location of the gas cylinder, and a valve manipulation unit configurable to be attached to or detached from the first surface, wherein the valve manipulation unit includes a first fastener configured to connect to the tool changer and a first gripper connected to the first fastener and configured to grip and rotate a valve locking device of the gas cylinder, the gas cylinder replacement apparatus further comprising a pipe handling unit configurable to be attached to or detached from the first surface, wherein the pipe handling unit includes a second fastener configured to connect to the tool changer, a second gripper connected to the second fastener and configured to grip a connector of the gas pipe, a gear configured to rotate the second gripper, gasket replacement means connected to the second fastener and configured to replace a gasket installed in the gas pipe, and cleaning means connected to the second fastener and configured to clean the gas pipe.

FIG. 16 is a diagram illustrating a method for removing the gas cylinder and the gas pipe from each other.

Referring to FIG. 16, first, the first gripper grips the valve locking device and rotates the valve locking device in clockwise or counterclockwise direction to lock the valve locking device in S200.

The gas cylinder replacement apparatus 10 may move the locomotion unit 200 to a position in front of the gas cabinet 20 which stores the gas cylinder 30 and the gas pipe 40 therein. The gas cylinder replacement apparatus 10 may fasten the tool changer 350 installed on the manipulator 300 to the first fastener 510. The first gripper 520 of valve manipulation unit 500 may grip the valve locking device 31. Then, the first gripper 520 rotates the valve locking device in a clockwise or counterclockwise direction so that the valve locking device 31 may be locked.

In some embodiments, when the valve locking device 31 has been connected to the pneumatic coupler 33, the first gripper 520 may grip the pneumatic coupler 33 and then remove the pneumatic coupler 33 from the valve locking device 31. For example, the first gripper 520 may grip the pneumatic coupler. Next, the manipulator 300 operates to remove the pneumatic coupler 33 from the valve locking device 31.

Next, the second gripper grips a connector of the gas pipe, and the gear rotates to remove the gas cylinder and the gas pipe from each other in S210.

The pipe handling unit 600 may grip the gas pipe 40 using the second gripper 620. Specifically, the second gripper 620 may grip the connector 45 of the gas pipe 40. When the second gripper 620 and the connector 45 are coupled to each other, the gear 630 may rotate to remove the gas pipe 40 and the gas cylinder 30 from each other. For example, the connector 45 may be a nut. Therefore, after the second gripper 620 grips the nut, the gear 630 rotates to remove the nut from the gas cylinder 30.

Next, the gasket replacement means removes the gasket installed in the gas pipe from the gas pipe in S220.

The gasket contaminated with the gas may be in an inserted state into the removed gas pipe 40. The gasket replacement means 640 may remove the gasket installed in the gas pipe 40 therefrom.

Subsequently, the cleaning means cleans the pipe in S230.

The gas pipe 40 may contain the salts resulting from chemical reactions of gas. The cleaning means 650 may clean the gas pipe 40 for reuse.

After completing the above process, the gas cylinder 30 may be unloaded.

FIG. 17 is a diagram illustrating a method for fastening a gas cylinder and a gas pipe to each other, such as may be performed in conjunction with loading a new gas cylinder into the gas cabinet.

Referring to FIG. 17, first, the gasket replacement means inserts the gasket into the gas pipe in S300.

When the gas pipe 40 and the new gas cylinder 30 have been fastened to each other, the pipe handling unit 600 may grip the connector 45 of the gas pipe 40 using the second gripper 620. Afterwards, the pipe handling unit 600 may insert the gasket into the gas pipe 40 using the gasket replacement means 640.

Next, the second gripper grips the connector of the gas pipe, and the manipulator connects the gas pipe and the gas cylinder to each other, and then the gear rotates to fasten the gas pipe and the gas cylinder to each other in S310.

The second gripper 620 may grip the connector 45 of the gas pipe 40. Subsequently, the gas cylinder replacement apparatus 10 may connect the gas pipe 40 and the gas cylinder 30 to each other using the manipulator 300. After the gas pipe 40 and the gas cylinder 30 have been connected to each other, the gear 630 may rotate. As the gear 630 rotates, the gas pipe 40 and the gas cylinder 30 may be fastened to each other. For example, the connector 45 of the gas pipe 40 may be a nut. After the nut of the gas pipe 40 has been connected to the gas cylinder 30, the gear 630 rotates such that the gas pipe 40 and the gas cylinder 30 may be fastened to each other.

Next, the first gripper grips the valve locking device and rotates the valve locking device clockwise or counterclockwise to open the valve locking device in S320.

The first gripper 520 may grip the valve locking device 31 and rotate the valve locking device clockwise or counterclockwise to open the valve locking device 31. When the valve locking device 31 has been opened, the gas may be supplied.

In some embodiments, when the valve locking device 31 is configured to be connected to the pneumatic coupler 33, the first gripper 520 may grip the pneumatic coupler 33. The manipulator 300 may connect the pneumatic coupler 33 gripped with the first gripper 520 to the valve locking device 31.

Although embodiments of the present disclosure have been described with reference to the accompanying drawings, the present disclosure is not limited to the above embodiments, but may be implemented in various different forms. A person skilled in the art may appreciate that the present disclosure may be practiced in other concrete forms without changing the technical spirit or essential characteristics of the present disclosure. Therefore, it should be appreciated that the embodiments as described above is not restrictive but illustrative in all respects.

What is claimed is:

1. A gas cylinder replacement system comprising:

a gas cabinet configured to store therein a gas pipe and a gas cylinder connected to the gas pipe;

a gas cylinder replacement apparatus; and a controller configured to control the gas cylinder replacement apparatus, wherein the gas cylinder replacement apparatus includes:

a body including a first surface and a second surface different from each other;

a locomotion unit installed on the second surface and configured to travel in a semiconductor process line;

a manipulator installed on the first surface and including a tool changer;

a vision unit installed at a distal end of the manipulator and configured to determine a location of the gas cylinder;

a valve manipulation unit configurable to be attached to or detached from the first surface, wherein the valve manipulation unit includes:

a first fastener configured to connect to the tool changer; and a first gripper connected to the first fastener and configured to grip and rotate a valve locking device of the gas cylinder; and a pipe handling unit configurable to be attached to or detached from the first surface, wherein the pipe handling unit includes:

a second fastener configured to connect to the tool changer;

a second gripper connected to the second fastener and configured to grip a connector of the gas pipe; and a gear configured to rotate the second gripper, and wherein the manipulator is configured to couple the tool changer with, or remove the tool changer from, the valve manipulation unit or the pipe handling unit.

2. The gas cylinder replacement system of claim 1, wherein the connector is configured to connect to the gas cylinder, wherein the pipe handling unit further comprises gasket replacement forceps connected to the second fastener and configured to replace a gasket installed in the connector, and wherein the gasket replacement forceps are configured to remove the gasket installed in the connector from the connector.

3. The gas cylinder replacement system of claim 2, wherein the pipe handling unit further includes a cleaning brush connected to the second fastener and configured to clean the connector.

4. The gas cylinder replacement system of claim 1, wherein the controller is configured to:

control the manipulator to fasten the tool changer and the first fastener to each other; and control the first gripper to grip the valve locking device and rotate the valve locking device clockwise or counterclockwise such that the valve locking device is locked.

5. The gas cylinder replacement system of claim 1, wherein the controller is configured to:

control the manipulator to fasten the tool changer and the second fastener to each other;

control the second gripper to grip the connector of the gas pipe; and control the gear to rotate the second gripper to remove the gas cylinder and the gas pipe from each other.

6. The gas cylinder replacement system of claim 5, wherein the gas cabinet includes gas pipe storage, and wherein the controller is configured to control the manipulator to store the gas pipe removed from the gas cylinder in the gas pipe storage.

7. The gas cylinder replacement system of claim 1, wherein in the gas cabinet, the valve locking device is connected to a pneumatic coupler, and wherein the controller is configured to:

control the first gripper to grip the pneumatic coupler; and control the manipulator to remove the valve locking device and the pneumatic coupler from each other.

8. The gas cylinder replacement system of claim 7, wherein the gas cabinet includes pneumatic coupler storage, and wherein the controller is configured to control the manipulator to store the pneumatic coupler removed from the valve locking device in the pneumatic coupler storage.

9. The gas cylinder replacement system of claim 1, wherein the pipe handling unit further includes a cleaning brush and gasket replacement forceps connected to the second fastener, wherein the cleaning brush is configured to clean the gas pipe, wherein the gasket replacement forceps are configured to replace a gasket installed in the gas pipe.

10. The gas cylinder replacement system of claim 1, wherein the gas cylinder includes an endcap, wherein the gas cabinet includes endcap storage, and wherein the controller is configured to:

control the second gripper to grip the endcap;

control the gear to rotate so as to remove the gas cylinder and the endcap from each other; and control the manipulator to store the endcap in the endcap storage.

11. A gas cylinder replacement system comprising:

a gas cabinet configured to store therein a gas pipe and a gas cylinder connected to the gas pipe;

a gas cylinder replacement apparatus; and a controller configured to control the gas cylinder replacement apparatus, wherein the gas cylinder replacement apparatus includes:

a body including a first surface and a second surface different from each other;

a locomotion unit installed on the second surface and configured to travel in a semiconductor process line;

a manipulator installed on the first surface and including a tool changer;

a vision unit installed at a distal end of the manipulator and configured to determine a location of the gas cylinder; and a valve manipulation unit configurable to be attached to or detached from the first surface, wherein the valve manipulation unit includes:

a first fastener configured to connect to the tool changer, and a first gripper connected to the first fastener and configured to grip and rotate a valve locking device of the gas cylinder;

a pipe handling unit configured to be attached to or detached from the first surface, wherein the pipe handling unit includes:

a second fastener configured to connect to the tool changer;

a second gripper connected to the second fastener and configured to grip a connector of the gas pipe; and a gear configured to rotate the second gripper;

gasket replacement forceps connected to the second fastener and configured to replace a gasket installed in the connector and to remove the gasket installed in the connector from the connector; and a cleaning brush connected to the second fastener and configured to clean the connector, and wherein the connector is configured to connect to the gas cylinder.

12. The gas cylinder replacement system of claim 11, wherein when the gas pipe and the gas cylinder are connected to each other, the controller is configured to:

control the manipulator to connect the tool changer and the first fastener to each other;

control the first gripper to grip the valve locking device and to rotate the valve locking device clockwise or counterclockwise such that the valve locking device is locked;

control the manipulator to remove the tool changer from the first fastener and connect the tool changer to the second fastener;

control the second gripper to grip the connector of the gas pipe; and control the gear to rotate the second gripper to remove the gas cylinder and the gas pipe from each other.

13. The gas cylinder replacement system of claim 12, wherein the gas cabinet includes gas pipe storage, and wherein the controller is configured to:

control the gasket replacement forceps to remove the gasket from the gas pipe;

control the cleaning brush to clean the gas pipe; and control the manipulator to store the gas pipe in the gas pipe storage.

14. The gas cylinder replacement system of claim 11, wherein when the connector and the gas cylinder are not connected to each other, the controller is configured to:

control the manipulator to connect the tool changer and the second fastener to each other;

control the second gripper to grip the connector;

control the manipulator to connect the gas pipe and the gas cylinder to each other;

control the gear to rotate the connector to fasten the gas pipe and the gas cylinder to each other;

control the manipulator to remove the tool changer from the second fastener and to connect the tool changer to the first fastener; and control the first gripper to grip the valve locking device and to rotate the valve locking device clockwise or counterclockwise such that the valve locking device is opened.

15. The gas cylinder replacement system of claim 14, wherein the gas cabinet includes endcap storage and pneumatic coupler storage, and wherein the controller is configured to:

control the second gripper to grip an endcap stored in the endcap storage and to fasten the endcap to the gas cylinder; and control the first gripper to grip a pneumatic coupler stored in the pneumatic coupler storage and to connect the pneumatic coupler to the valve locking device.

16. A gas cylinder replacement system comprising:

a gas cabinet configured to store therein a gas pipe and a gas cylinder connected to the gas pipe;

a gas cylinder replacement apparatus; and a controller configured to control the gas cylinder replacement apparatus, wherein the gas cylinder replacement apparatus includes:

a body including a first surface and a second surface different from each other;

a locomotion unit installed on the second surface and configured to travel in a semiconductor process line;

a manipulator installed on the first surface and including a tool changer;

a vision unit installed at a distal end of the manipulator and configured to determine a location of the gas cylinder;

a valve manipulation unit configurable to be attached to or detached from the first surface; wherein the valve manipulation unit includes:

a first fastener configured to connect to the tool changer; and a first gripper connected to the first fastener and configured to grip and rotate a valve locking device of the gas cylinder; and a pipe handling unit configurable to be attached to or detached from the first surface, wherein the pipe handling unit includes:

a second fastener configured to connect to the tool changer;

a second gripper connected to the second fastener and configured to grip a connector of the gas pipe; and a gear configured to rotate the second gripper, wherein the controller is configured to:

control the manipulator to fasten the tool changer and the first fastener to each other; and control the first gripper to grip the valve locking device and rotate the valve locking device clockwise or counterclockwise such that the valve locking device is locked.

17. The gas cylinder replacement system of claim 16, wherein the controller is configured to:

control the manipulator to fasten the tool changer and the second fastener to each other;

control the second gripper to grip the connector of the gas pipe; and control the gear to rotate the second gripper to remove the gas cylinder and the gas pipe from each other.

18. The gas cylinder replacement system of claim 17, wherein the gas cabinet includes gas pipe storage, and wherein the controller is configured to control the manipulator to store the gas pipe removed from the gas cylinder in the gas pipe storage.

19. The gas cylinder replacement system of claim 16, wherein in the gas cabinet, the valve locking device is connected to a pneumatic coupler, and wherein the controller is configured to:

control the first gripper to grip the pneumatic coupler; and control the manipulator to remove the valve locking device and the pneumatic coupler from each other.

20. The gas cylinder replacement system of claim 19, wherein the gas cabinet includes pneumatic coupler storage, and wherein the controller is configured to control the manipulator to store the pneumatic coupler removed from the valve locking device in the pneumatic coupler storage.

* * * * *